(12) United States Patent
Kobayashi

(10) Patent No.: US 12,510,207 B2
(45) Date of Patent: Dec. 30, 2025

(54) BASE OF TRESTLE, TRESTLE PROVIDED WITH BASE, AND MANUFACTURING METHOD FOR BASE OF TRESTLE

(71) Applicants: Sunstack, LLC, Plainfield, NJ (US); Roof and Solar Technologies Inc., Poway, CA (US)

(72) Inventor: Shuichi Kobayashi, Poway, CA (US)

(73) Assignees: SUNSTACK, LLC, Plainfield, NJ (US); ROOF AND SOLAR TECHNOLOGIES INC., Poway, CA (US)

( * ) Notice: Subject to any disclaimer, the term of this patent is extended or adjusted under 35 U.S.C. 154(b) by 136 days.

(21) Appl. No.: 18/316,810

(22) Filed: May 12, 2023

(65) Prior Publication Data

US 2024/0200718 A1    Jun. 20, 2024

(30) Foreign Application Priority Data

Dec. 16, 2022    (JP) ................................. 2022-201037

(51) Int. Cl.
*F16M 13/02*    (2006.01)

(52) U.S. Cl.
CPC ......... *F16M 13/02* (2013.01); *F16M 2200/08* (2013.01)

(58) Field of Classification Search
CPC ... F16M 13/02; F16M 2200/08; F24S 25/613; F24S 25/61; H02S 20/23; E04B 2001/389; E04B 2001/2415; E04D 13/0404; E04D 13/04

USPC ................. 248/200, 237; 52/772, 774, 173.3
See application file for complete search history.

(56) References Cited

U.S. PATENT DOCUMENTS

| | | | |
|---|---|---|---|
| 8,756,881 B2* | 6/2014 | West | F24S 25/40 52/173.3 |
| 2012/0275844 A1 | 11/2012 | Kobayashi | |
| 2013/0133270 A1 | 5/2013 | West et al. | |
| 2018/0342974 A1* | 11/2018 | Jasmin | F24S 25/636 |

FOREIGN PATENT DOCUMENTS

| | | |
|---|---|---|
| JP | 2004-150137 A | 5/2004 |
| JP | 2012-241410 A | 12/2012 |

(Continued)

OTHER PUBLICATIONS

Office Action dated Nov. 21, 2023, issued for the corresponding Japanese Patent Application No. 2022-201037.

(Continued)

*Primary Examiner* — Kimberly T Wood
(74) *Attorney, Agent, or Firm* — Ohlandt, Greeley and Perle, LLP.

(57) ABSTRACT

A base of a trestle is for fixing a solar panel to be installed on a roof surface of a building including an eave of a roof and a ridge provided upward from the eave. The base includes a base main body and a wall. The base main body is mounted on the roof surface, and a first groove, as a fixing groove, used to fix the solar panel is formed in the base main body. The wall is provided on an end toward the ridge, that is, toward the −X side, of the base main body, is formed protruding with respect to the roof surface, and is formed integrally with the base main body.

13 Claims, 24 Drawing Sheets

(56) References Cited

FOREIGN PATENT DOCUMENTS

JP          5404354 B2    1/2014
WO     2011-096107 A1    8/2011

OTHER PUBLICATIONS

Canadian Office Action dated Aug. 5, 2024 for Canadian Appl. No. 221027.
Canadian Office Action dated Sep. 20, 2024 for Canadian Appl. No. 3200010.

* cited by examiner

BASE OF TRESTLE, TRESTLE PROVIDED WITH BASE, AND MANUFACTURING METHOD FOR BASE OF TRESTLE

CROSS-REFERENCE TO RELATED APPLICATION

This application claims the benefit of Japanese Patent Application No. 2022-201037, filed on Dec. 16, 2022, the entire disclosure of which is incorporated by reference herein.

FIELD

This application relates to a base of a trestle, a trestle provided with the base, and a manufacturing method for the base of the trestle.

BACKGROUND

Japanese Patent No. 5404354 describes a solar cell module support structure that includes an installation bracket on which a solar cell module is installed, and a drain board, and that is attached to a metal roof of a building. Japanese Patent No. 5404354 indicates that a protrusion is formed along an outer peripheral shape of a base of the installation bracket on the drain board, protruding so as to rise from the metal roof surface. The protrusion prevents rain water and the like from entering into the inside.

Japanese Patent No. 5404354 indicates that, although a part for preventing rainwater from entering is formed on the drain board, a part for fixing the solar cell module or the installation bracket is not formed on the drain board. Therefore, a part for fixing the solar cell module or the installation bracket must be separately prepared, which may lead to an increase in manufacturing costs.

The present disclosure is made with the view of the above situation, and an objective of the present disclosure is to provide a base of a trestle whereby manufacturing costs can be suppressed, a trestle provided with the base, and a manufacturing method for the base of the trestle.

SUMMARY

A base of a trestle according to a first aspect of the present disclosure that achieves the objective described above is
  a base of a trestle for fixing an installation object to be installed on a roof surface of a building including an eave of a roof and a ridge provided upward from the eave, the base including;
  a base main body that is attached to the roof surface and in which a fixing groove used to fix the installation object is formed; and
  a wall that is provided on an end toward the ridge of the base main body, is formed protruding with respect to the roof surface, and is formed integrally with the base main body.

A first inclined surface that is inclined with respect to an eave-ridge direction may be formed on the wall, the eave-ridge direction being a direction from the ridge toward the eave of the building.

The first inclined surface may be formed on a plane orthogonal to the roof surface.

A second inclined surface that has a different incline with respect to the eave-ridge direction than the first inclined surface may be formed on the wall.

The second inclined surface may be formed on a plane orthogonal to the roof surface.

The first inclined surface may be formed at an angle of inclination within a range of 90° to 150° with respect to the second inclined surface.

The angle of inclination of the first inclined surface relative to the second inclined surface may be 120°.

The angle of inclination of the first inclined surface relative to the second inclined surface may be 90°.

A protruding surface that is provided between the first inclined surface and the second inclined surface and that protrudes in a ridge direction may be formed on the wall.

The protruding surface may be formed as a curved surface.

A pair of side walls may be provided on the base main body, the fixing groove being formed on an inner side of the pair of side walls,
  a flowpath on which a fluid can flow from the fixing groove may be formed on an interior of the side walls, and
  a discharge port through which the fluid flowing in the flowpath is discharged from the interior of the side walls out of the base main body may be formed at an end on the eave side of the side walls.

A trestle according to a second aspect of the present disclosure includes:
  the base of the trestle according to the first aspect of the present disclosure.

The trestle may include:
  a slide member slidably fitted in the fixing groove, and
  a fixing unit installed on the slide member and for fixing the installation object.

A manufacturing method for the base of a trestle according to a third aspect of the present disclosure is:
  the manufacturing method for the base of the trestle according to the first aspect of the present disclosure, the method including:
  integrally forming the base main body and the wall by casting.

With the base of the trestle according to the present disclosure, the wall is provided on the end toward ridge of the base main body, is formed protruding with respect to the roof surface, and is formed integrally with the base main body. As such, in the present disclosure, a base of a trestle whereby manufacturing costs can be suppressed, a trestle provided with the base, and a manufacturing method for the base of the trestle can be provided.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Hereinafter, Embodiment 1 of the present disclosure is described using the drawings. Note that, to facilitate comprehension, XYZ coordinates are set and appropriately referenced.

Figure 1:
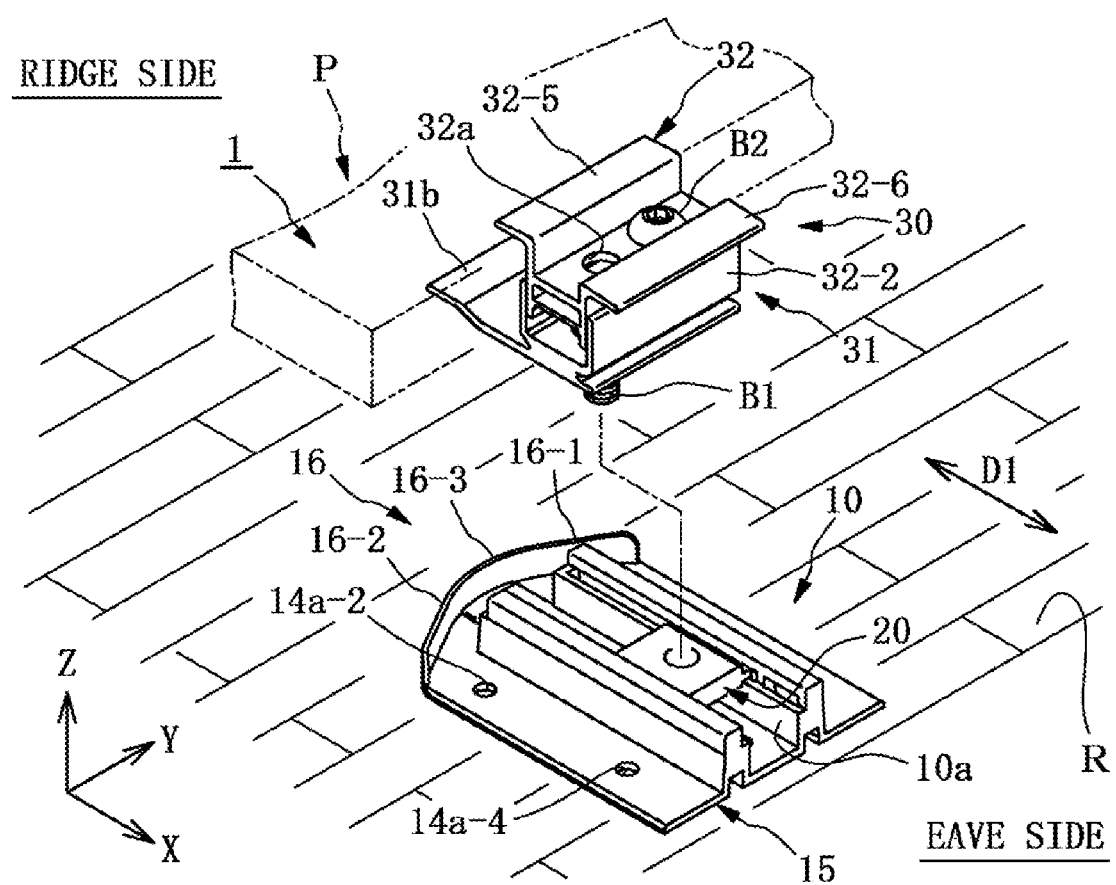
FIG. 1 is an (first) exploded perspective view of a trestle according to Embodiment 1 of the present disclosure.
Figure 2:
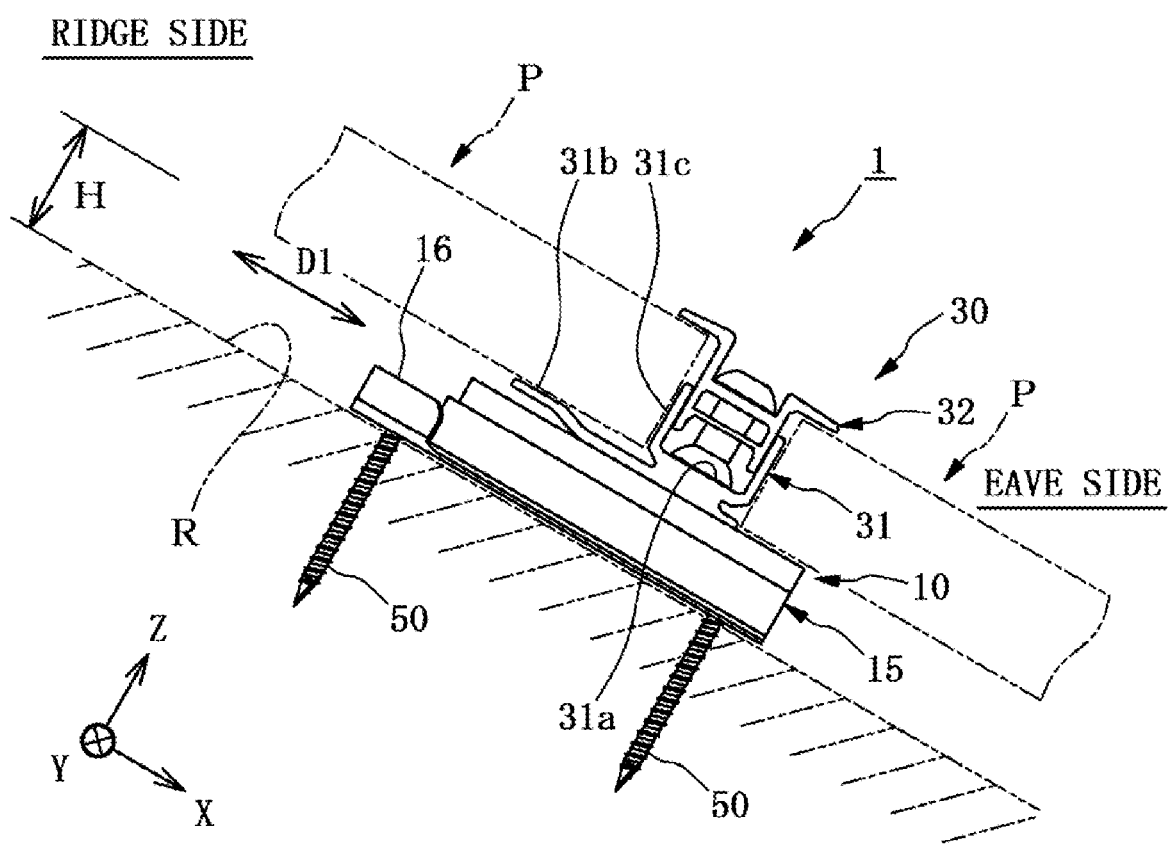
FIG. 2 is a side view of the trestle according to Embodiment 1.
Figure 3:
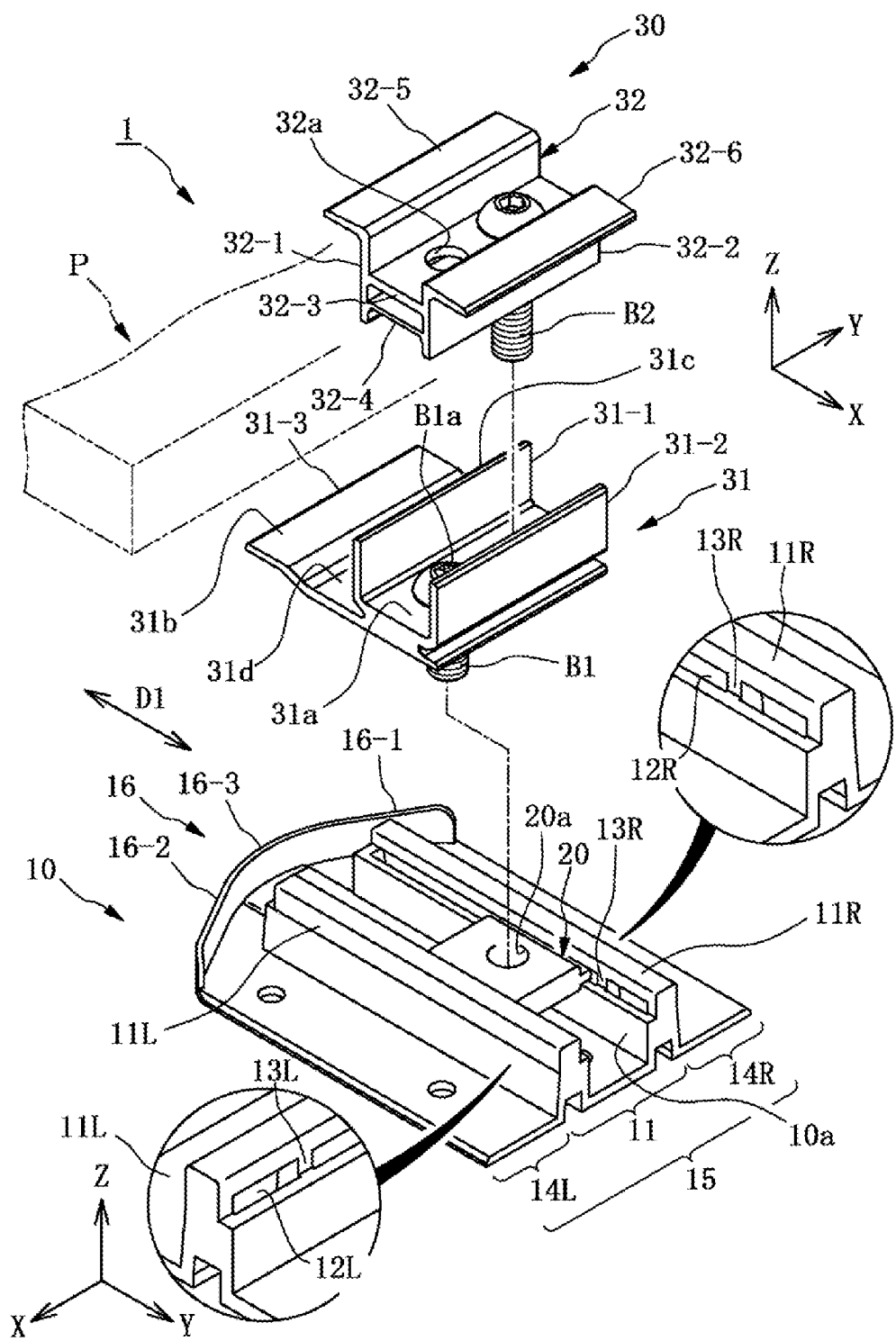
FIG. 3 is an (second) exploded perspective view of the trestle according to Embodiment 1.
Figure 4:
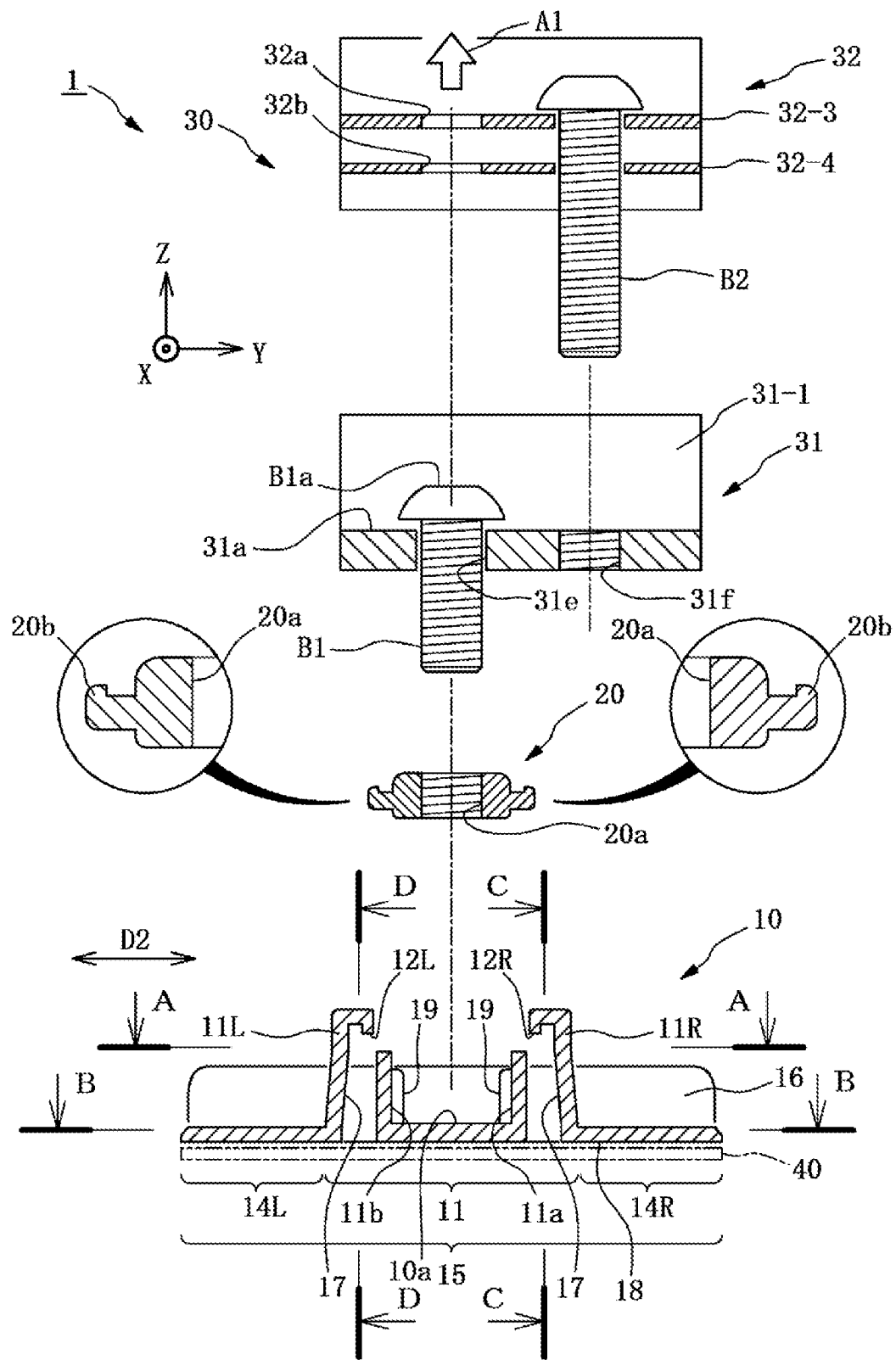
FIG. 4 is an (first) exploded cross-sectional view of the trestle according to Embodiment 1.

As illustrated in FIGS. 1 and 2, a trestle 1 is, for example, mounted on a roof surface R of a building and is used to support a solar panel P as an installation object to be installed on the roof surface R parallel to the XY plane. Note that, in Embodiment 1, the building on which the trestle 1 is mounted is a house that includes eaves of the roof and ridges provided upward from the eaves. The trestle 1 according to Embodiment 1 includes a base 10, a slide bracket 20, and a fixing unit 30. Additionally, as illustrated in FIGS. 3 and 4, the trestle 1 includes a first fastener B1 and a second fastener B2 in addition to the base 10, the slide bracket 20, and the fixing unit 30.

The base 10 is a member that supports the fixing unit 30. In one example, the base 10 is formed from a metal. Specifically, in one example, the base 10 is formed by casting using dies. This base 10 includes a base main body 15 and a wall 16.

The base main body 15 is used mounted on the roof surface R. Additionally, a first groove 10a, as a fixing groove, that is used to fix the solar panel P is formed on the base main body 15. The base main body 15 includes a groove forming portion 11 where the first groove 10a is provided, and plate-like flange portions 14R, 14L formed projecting in the +Y direction and the −Y direction from the groove forming portion 11.

In the groove forming portion 11, the first groove 10a is formed along a first direction D1 that is the same direction as the X-axis direction. This groove forming portion 11 includes a pair of side walls 11R, 11L, the first groove 10a being formed on an inner side of the pair of side walls 11R, 11L.

Figure 5A:
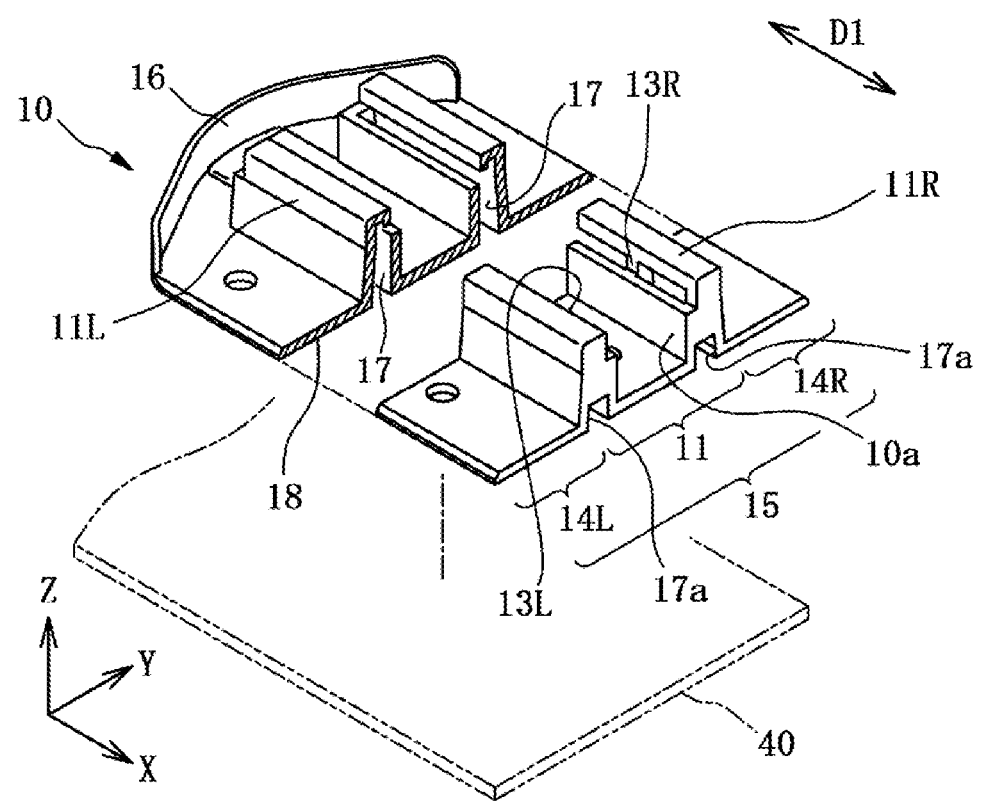
FIG. 5A is a (first) perspective view of a base of the trestle according to Embodiment 1.
Figure 5B:
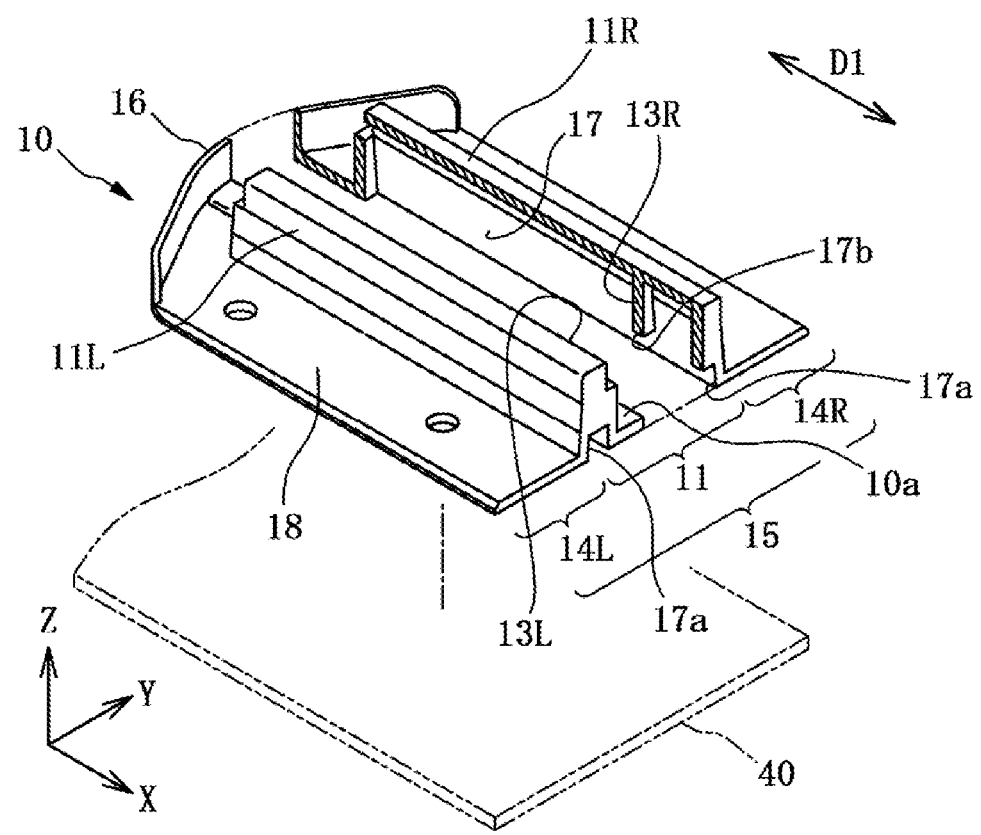
FIG. 5B is a perspective view illustrating a cross-section of FIG. 4, taken along line C-C.
Figure 5C:
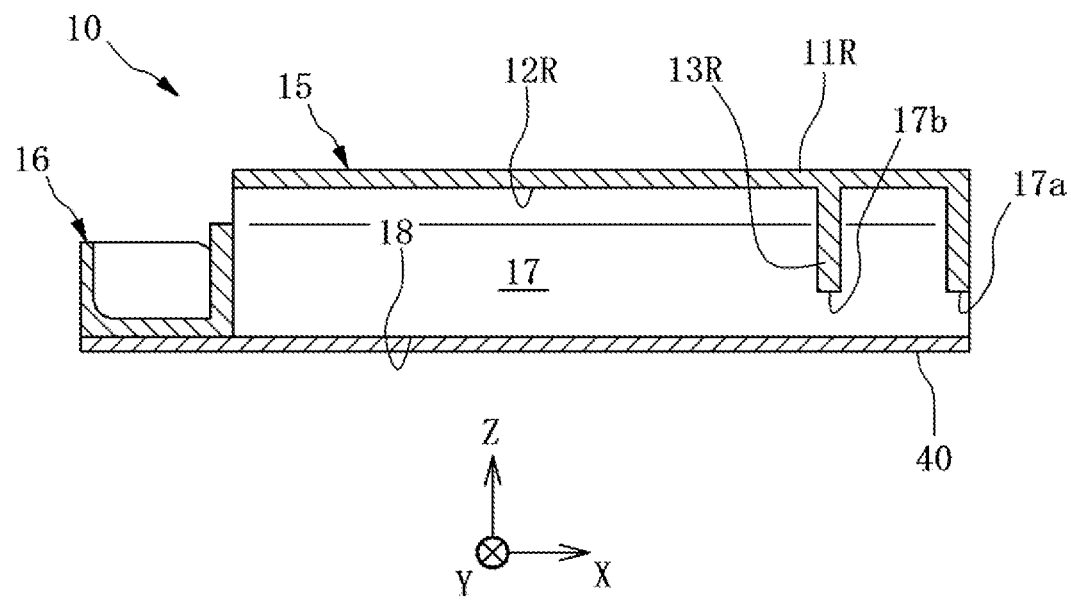
FIG. 5C is a cross-sectional view of FIG. 4, taken along line C-C.
Figure 5D:
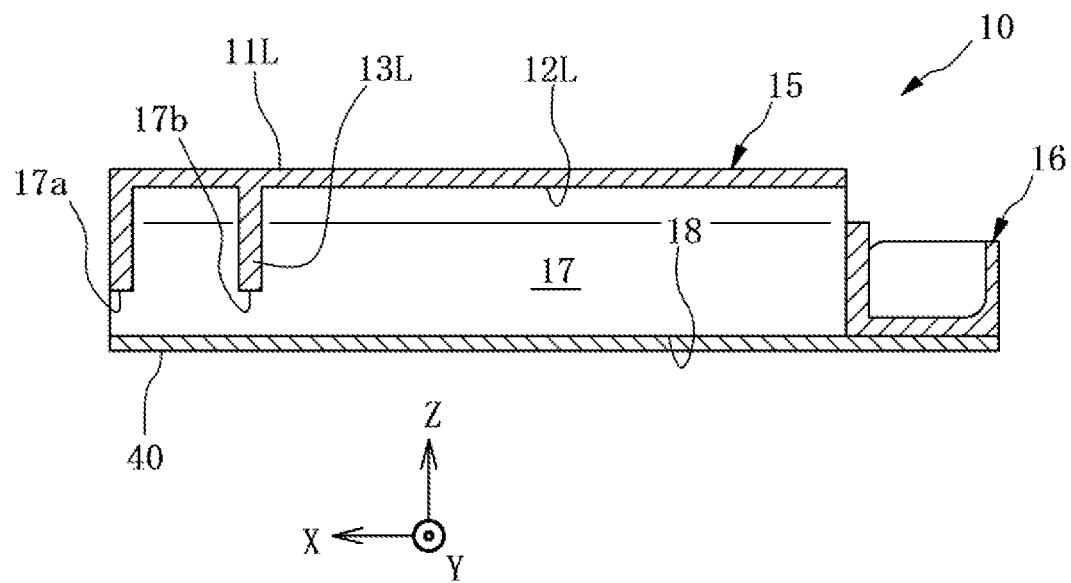
FIG. 5D is a cross-sectional view of FIG. 4, taken along line D-D.

As illustrated in FIGS. 4 and 5A, a flowpath 17 is formed in the side walls 11R, 11L. The flowpath 17 leads from the first groove 10a to a rear surface 18 on the −Z side of the base main body 15. The flowpath 17 is formed as a component where a fluid such as rainwater and the like can flow. Note that the base 10 is used with a sheet 40 made from butyl rubber, for example, affixed to the rear surface 18 thereof. Accordingly, the rainwater flowing in the flowpath 17 does not flow out in the downward direction (the −Z direction). As illustrated in FIGS. 5A, 5B, 5C, and 5D, a discharge port 17a through which the rainwater flowing in the flowpath 17 is discharged from the interior of the side walls 11R, 11L out of the base main body 15 is formed on a eave-side (+X side) of the side walls 11R, 11L. Additionally, an interior flowpath 17b through which the rainwater flows is formed in the interior of the side walls 11R, 11L and on a lower size (the −Z side) of slide restrictors 13R, 13L. Note that the shape of the sheet 40 made from butyl rubber is an example, and the shape is not limited thereto. Additionally, the material of the sheet 40 is not limited to butyl rubber, and may be a material other than butyl rubber.

As illustrated in FIGS. 4 and 5A, a pair of second grooves 12R, 12L, in which a portion of the slide bracket 20 fits, is formed on respective opposing surfaces of the pair of side walls 11R, 11L.

Figure 6:
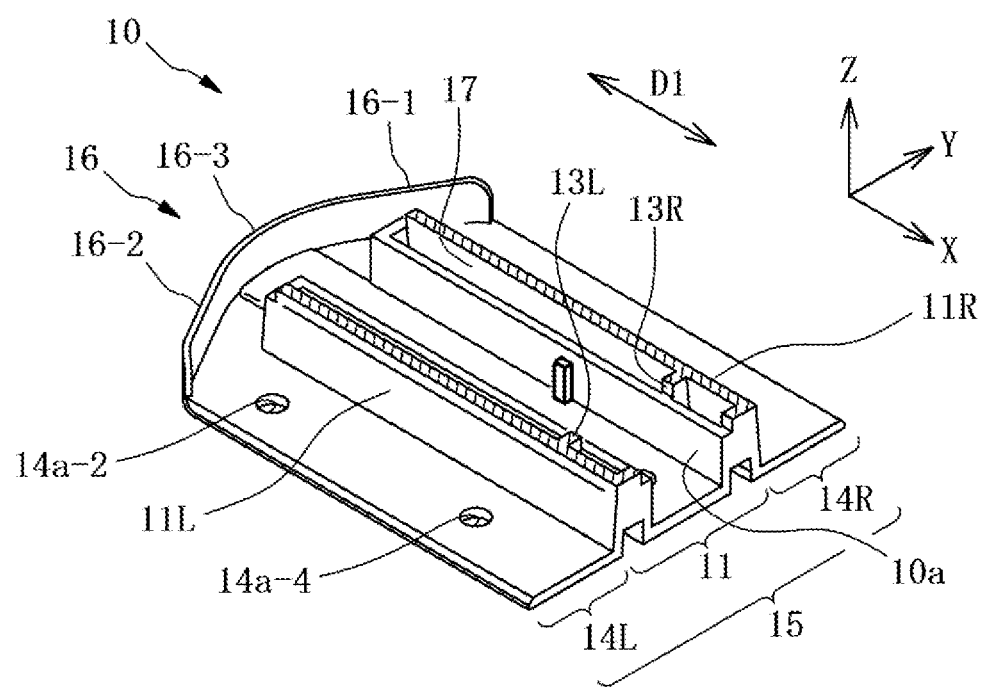
FIG. 6 is a perspective view illustrating a cross-section of FIG. 4, taken along line A-A.

The second grooves 12R, 12L are formed so as to extend along the first direction D1 (the X-axis direction). As illustrated in FIGS. 3 and 6, slide restrictors 13R, 13L are formed in the second grooves 12R, 12L. Note that, in Embodiment 1, the slide restrictors 13R, 13L are respectively formed in the second grooves 12R, 12L and, thus, two are formed. However, the present disclosure is not limited thereto. The slide restrictors 13R, 13L may be formed in one of the second grooves 12R, 12L.

The slide restrictors 13R, 13L are formed to restrict sliding, with respect to the base 10, of the slide bracket 20 in the first direction D1. In Embodiment 1, the slide restrictors 13R, 13L restrict sliding, with respect to the base 10, of the slide bracket 20 in the +X direction.

Figure 7:
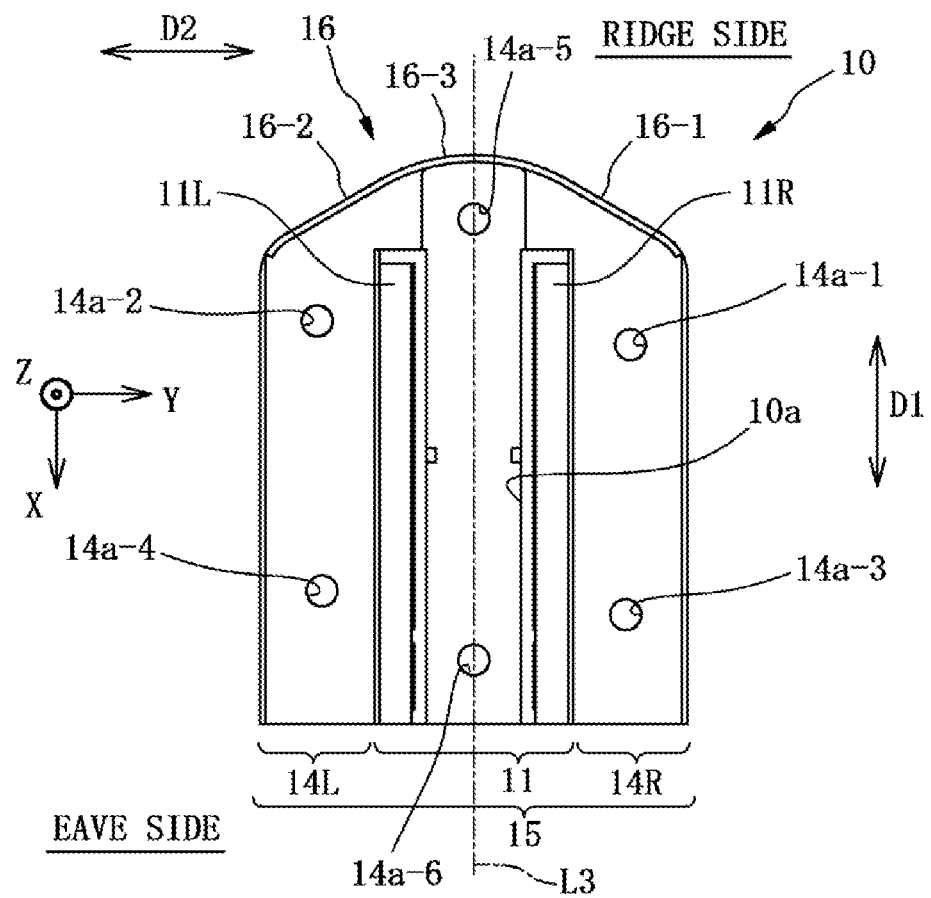
FIG. 7 is a plan view of the base according to Embodiment 1.

As illustrated in FIG. 7, fastener insertion holes 14a-1 to 14a-4 are formed, penetrating in a Z-axis direction, on the flange portions 14R, 14L.

The fastener insertion holes 14a-1 to 14a-4 are round holes into which roof surface mounting fasteners 50 (see FIG. 2) are inserted. Of the four fastener insertion holes 14a-1 to 14a-4, the fastener insertion holes 14a-3 and 14a-4 are provided more toward the eave side (downward, toward the +X side) in an eave-ridge direction than the fastener insertion holes 14a-1 and 14a-2. Here, the eave-ridge direction is a direction from the ridges toward the eaves of the house. Note that, in Embodiment 1, the eave-ridge direction is the same direction as the first direction D1.

Figure 8:
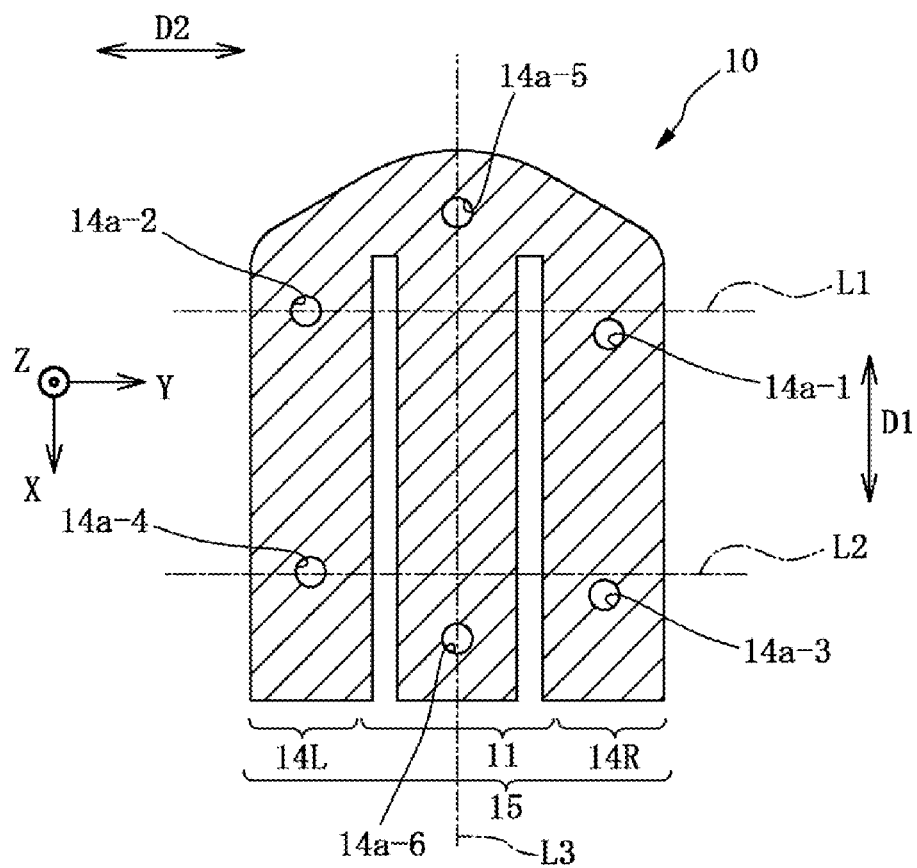
FIG. 8 is a cross-sectional view of FIG. 4, taken along line B-B.

As illustrated in FIG. 8, when viewed planarly, the fastener insertion hole 14a-1 is formed at a position offset from a straight line L1 that passes through the center of the fastener insertion hole 14a-2 and that is parallel to the Y-axis direction. As a result, the fastener insertion hole 14a-1 is formed at a position offset more in the eave-ridge direction (the X-axis direction) than the forming position of the fastener insertion hole 14a-2. Specifically, in Embodiment 1, the fastener insertion hole 14a-1 is formed at a position more offset toward the +X side (downward) in the eave-ridge direction than the forming position of the fastener insertion hole 14a-2.

As with the fastener insertion holes 14a-1, 14a-2, the fastener insertion holes 14a-3, 14a-4 are formed at positions at which the first groove 10a is provided therebetween. Moreover, when viewed planarly, the fastener insertion hole 14a-3 is formed at a position offset from a straight line L2 that passes through the center of the fastener insertion hole 14a-4 and that is parallel to the Y-axis direction and to the straight line L1. As a result, the fastener insertion hole 14a-3 is formed at a position offset more in the eave-ridge direction (the X-axis direction) than the forming position of the fastener insertion hole 14a-4. Specifically, in Embodiment 1, the fastener insertion hole 14a-3 is formed at a position more offset toward the +X side (downward) in the eave-ridge direction than the forming position of the fastener insertion hole 14a-4.

As illustrated in FIGS. 7 and 8, in addition to the fastener insertion holes 14a-1 to 14a-4, fastener insertion holes 14a-5, 14a-6 are formed on the base 10.

The fastener insertion holes 14a-5, 14a-6 are formed penetrating in the Z-axis direction, on a bottom surface of the first groove 10a. The fastener insertion hole 14a-6 is provided more toward the eave side (downward, toward the +X side) in the eave-ridge direction than the fastener insertion hole 14a-5. The fastener insertion holes 14a-5 and 14a-6 are formed such that centers of these holes overlap a straight line L3 parallel to the Y-axis direction.

As illustrated in FIG. 8, the fastener insertion hole 14a-5 is formed at a position offset more in the eave-ridge direction (the X-axis direction) than the forming positions of the fastener insertion holes 14a-1, 14a-2. More specifically, in Embodiment 1, the fastener insertion hole 14a-5 is formed at a position more offset toward the −X side (upward) in the eave-ridge direction than the forming positions of the fastener insertion holes 14a-1, 14a-2.

The fastener insertion hole 14a-6 is formed at a position offset more in the eave-ridge direction (the X-axis direction) than the forming positions of the fastener insertion holes 14a-3, 14a-4. More specifically, in Embodiment 1, the fastener insertion hole 14a-6 is formed at a position more offset toward the +X side (downward) in the eave-ridge direction than the forming positions of the fastener insertion holes 14a-3, 14a-4.

Fasteners, made from metal or wood, for mounting the base 10 on the roof of the building are inserted into the fastener insertion holes 14a-1 to 14a-6. However, the fasteners inserted into the fastener insertion holes 14a-1 to 14a-6 are not limited to being made from metal or wood. The fasteners inserted into the fastener insertion holes 14a-1 to 14a-6 may be formed from a material other than metal or wood.

Figure 9:
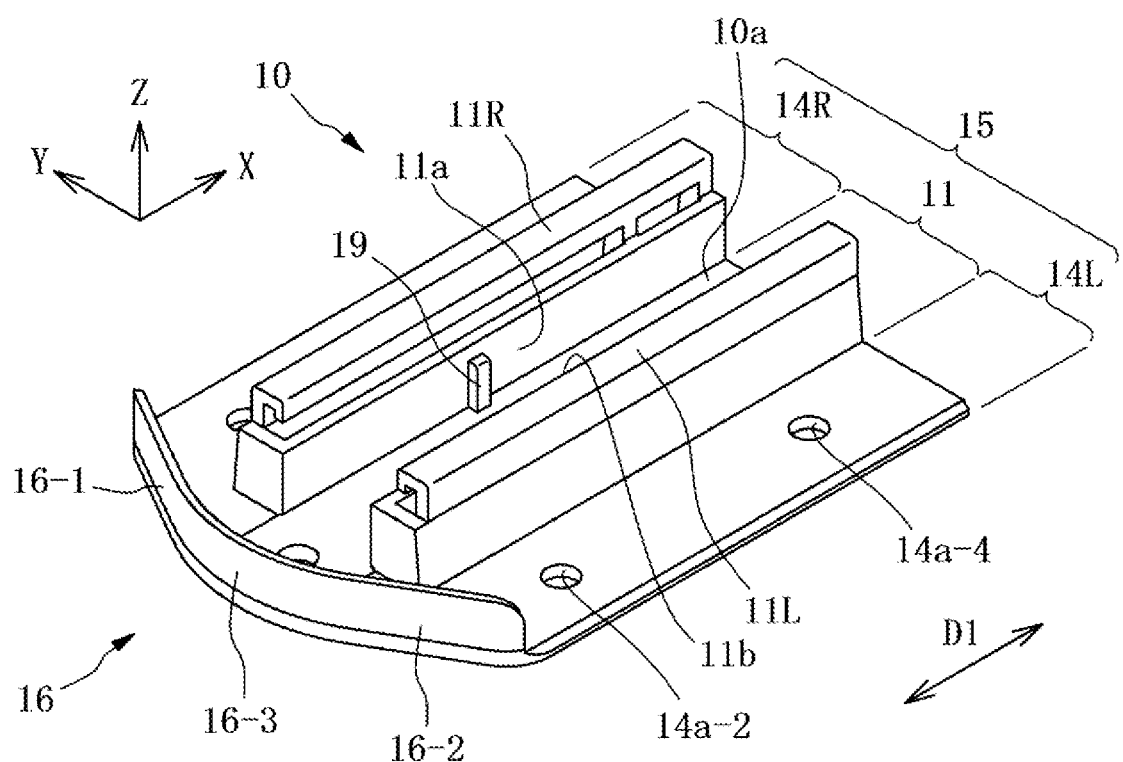
FIG. 9 is a (second) perspective view of the base according to Embodiment 1.

As illustrated in FIGS. 4 and 9, a rib 19 is formed on the respective opposing surfaces 11a, 11b of the pair of side walls 11R, 11L. The rib 19 enhances the rigidity of the portions of the side walls 11R, 11L where the opposing surfaces 11a, 11b are provided, and is formed to suppress buckling of the portions where the opposing surface 11a, 11b are provided.

As illustrated in FIG. 9, the wall 16 is provided at the end toward the ridge (toward the −X side) in the base main body 15, and is formed protruding upward (in the +Z direction) with respect to the XY plane. The wall 16 is formed integrally with the base main body 15 by casting. For example, the wall 16 is used to prevent rainwater flowing from the ridge side from contacting the fasteners inserted into the fastener insertion holes 14a-2, 14a-4. A first inclined surface 16-1, a second inclined surface 16-2, and a protruding surface 16-3 are formed on the wall 16.

Figure 10:
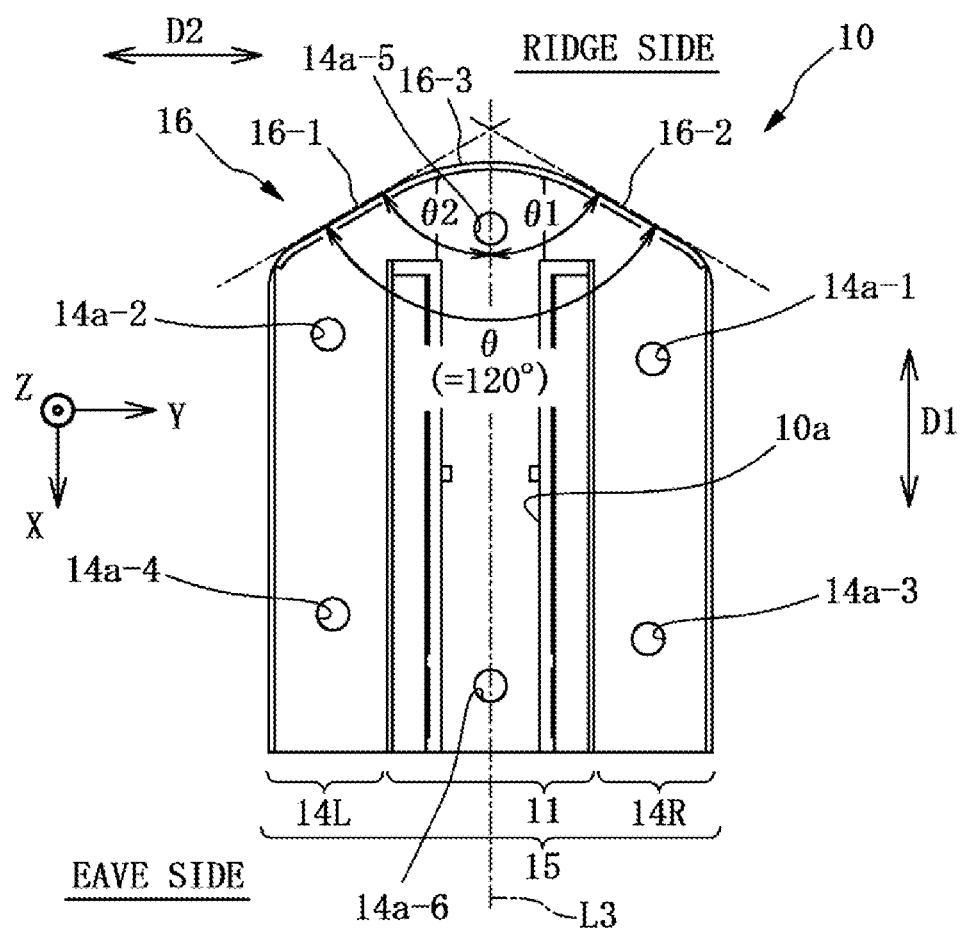
FIG. 10 is a plan view of the base for explaining angles of inclination of a first inclined surface and a second inclined surface.

As illustrated in FIG. 10, the first inclined surface 16-1 is formed inclined with respect to the first direction D1. Specifically, an angle of inclination θ1 of the first inclined surface 16-1, relative to the straight line L3 that passes through the centers of the fastener insertion holes 14a-5, 14a-6, is 60°. As illustrated in FIG. 9, the first inclined surface 16-1 is formed on a plane orthogonal to the XY plane that is parallel to the roof of the building so as to more easily prevent the rainwater flowing from the ridge side.

As illustrated in FIG. 10, the second inclined surface 16-2 is a separate inclined surface from the first inclined surface 16-1. The second inclined surface 16-2 is formed inclined with respect to the first direction D1. Specifically, an angle of inclination θ2 of the second inclined surface 16-2, relative to the straight line L3 that passes through the centers of the fastener insertion holes 14a-5, 14a-6, is 60°. The second inclined surface 16-2 and the first inclined surface 16-1 are formed with plane symmetry to the XZ plane that includes the straight line L3 (θ1=θ2). As illustrated in FIG. 9, the second inclined surface 16-2 is formed on a plane orthogonal to the XY plane that is parallel to the roof of the building so as to more easily prevent the rainwater flowing from the ridge side.

The angle of inclination θ1 of the first inclined surface 16-1 is 60° and, also, the angle of inclination θ2 of the second inclined surface 16-2 is 60° and, as such, in Embodiment 1, the first inclined surface 16-1 is formed at an angle of inclination θ of 120° with respect to the second inclined surface 16-2.

As illustrated in FIGS. 9 and 10, the protruding surface 16-3 is provided between the first inclined surface 16-1 and the second inclined surface 16-2. The protruding surface 16-3 is formed protruding in the ridge direction (the −X direction). The protruding surface 16-3 is formed as a curved surface in Embodiment 1. This protruding surface 16-3 is formed on a plane orthogonal to the XY plane that is parallel to the roof of the building so as to more easily prevent the rainwater flowing from the ridge side.

Figure 11A:
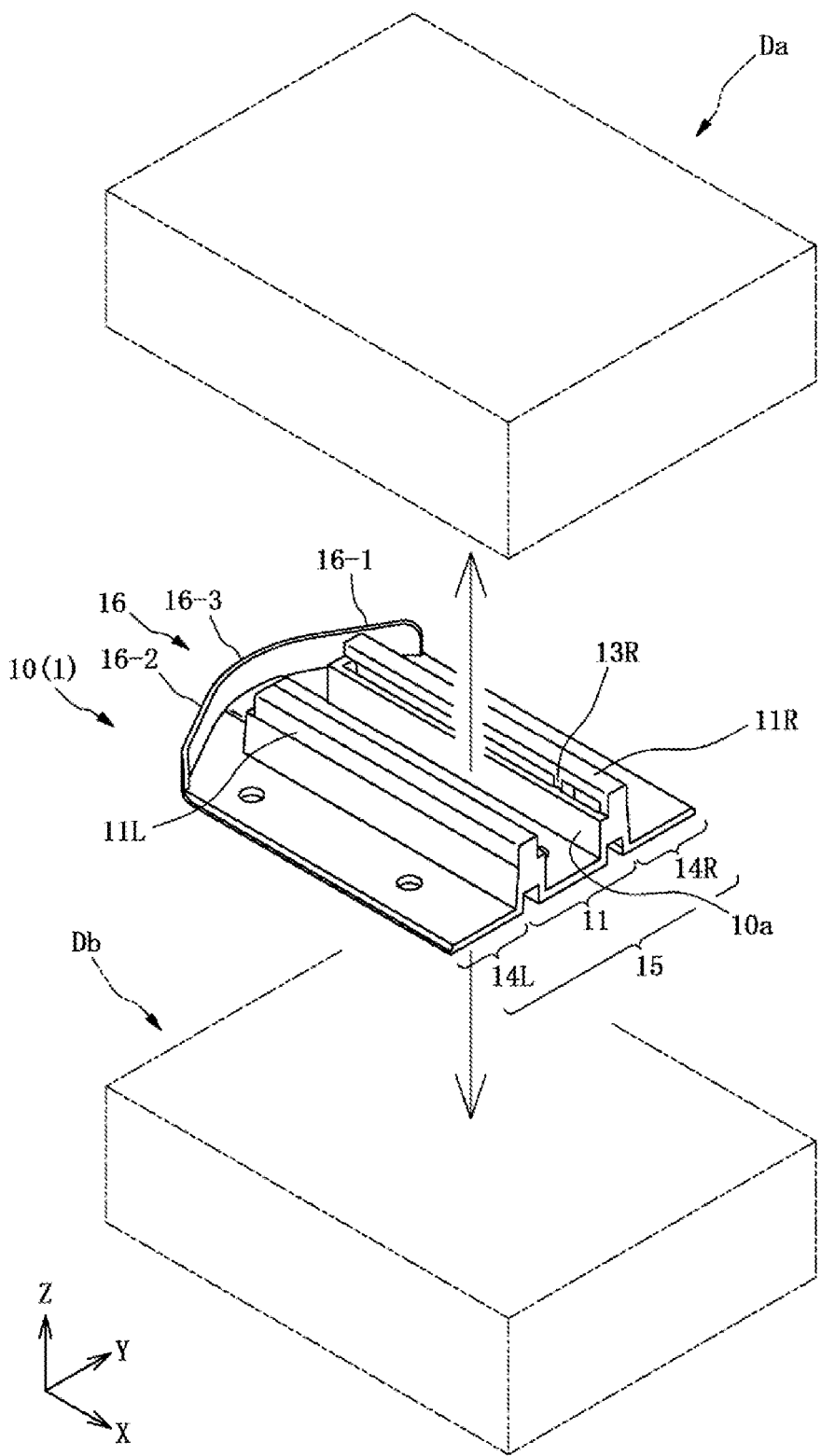
FIG. 11A is a perspective view for explaining a manufacturing method for the base according to Embodiment 1.
Figure 11B:
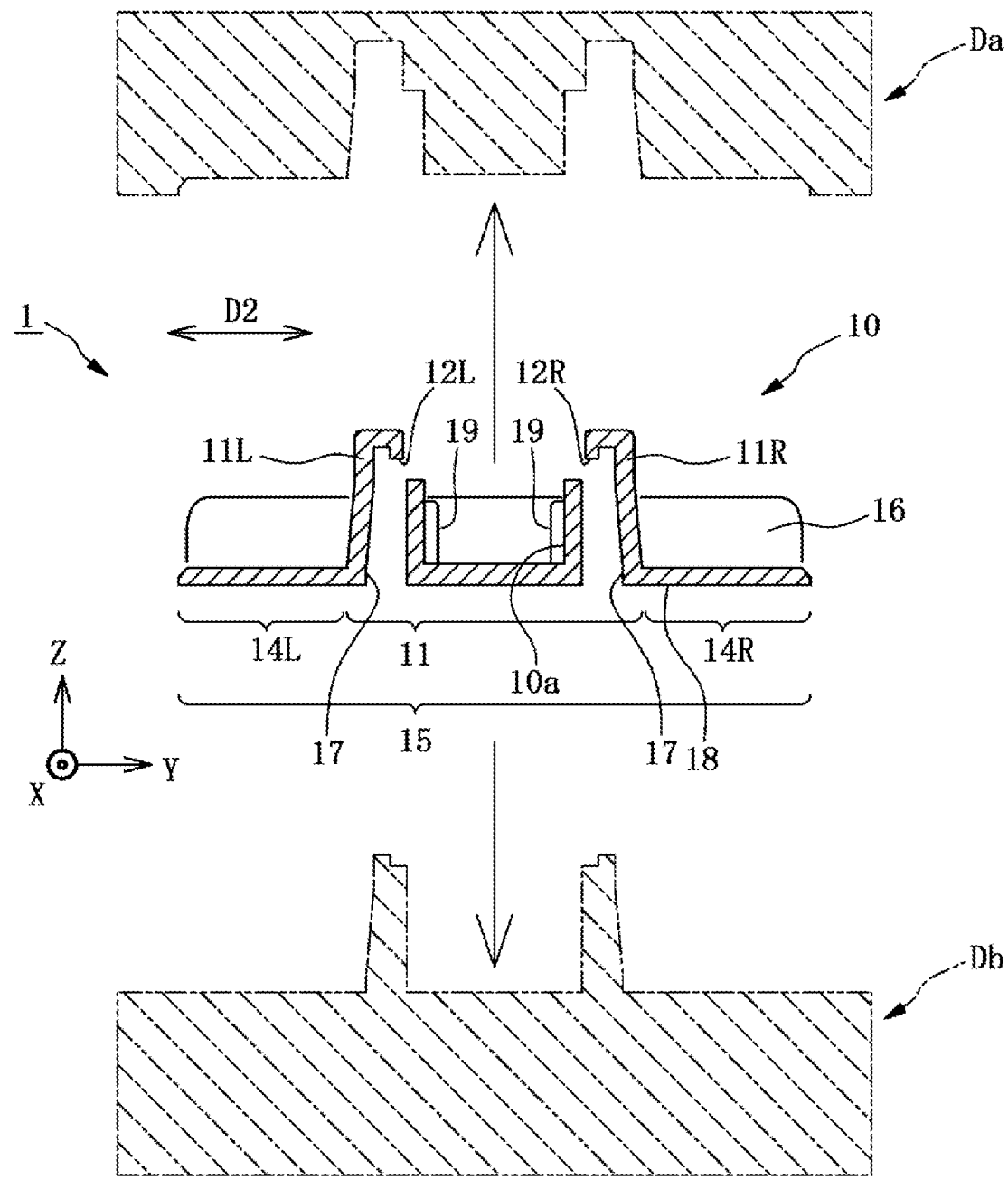
FIG. 11B is a cross-sectional view for explaining the manufacturing method for the base according to Embodiment 1.

As illustrated in FIGS. 11A and 11B, the base 10 configured in the manner described above is manufactured while integrally forming the base main body 15 and the wall 16 by, for example, performing casting in which at least two dies, namely a first die Da and a second die Db, are opened in the up-down direction (the +Z direction and the −Z direction). However, the present disclosure is not limited thereto, and a manufacturing method other than casting may be used provided that the base main body 15 and the wall 16 can be integrally formed. Among the various casting methods, it is preferable that the base 10 is manufactured by die casting. However, the present disclosure is not limited thereto. The base 10 may be manufactured by casting other than die casting such as casting using sand molds, gypsum molds, resin molds, lost wax molds, or the like.

As illustrated in FIG. 3, the slide bracket 20 is fitted in the first groove 10a of the base 10 so as to be slidable in the first direction D1. The slide bracket 20 is attached to the base 10 at a desired position in the first direction D1 to perform positioning of the solar panel P in the first direction D1. In one example, the slide bracket 20 is formed from a metal and, specifically, is formed from a metal that is the same material as the base 10. A screw hole 20a is formed on the slide bracket 20.

The first fastener B1 is screwed into the screw hole 20a, and an inner circumferential surface of the screw hole 20a is formed into a female screw surface. The screw hole 20a is formed penetrating in the Z-axis direction.

As illustrated in FIG. 4, in addition to the screw hole 20a, a pair of fitters 20b is formed on the slide bracket 20.

The fitters 20b are portions that fit in the second grooves 12R, 12L formed on the side walls 11R, 11L of the base 10. The fitters 20b are formed such that YZ cross-sections thereof are L-shaped.

As illustrated in FIG. 2, the fixing unit 30 fixes the solar panel P. As illustrated in FIGS. 3 and 4, the fixing unit 30 is installed on the slide bracket 20 by the first fastener B1. In one example, the fixing unit 30 is formed from a metal and, specifically, is formed from a metal that is the same material as the base 10 and the slide bracket 20. The fixing unit 30 includes a receiving member 31 and a fixing unit main body 32.

The receiving member 31 is a fixture that receives the fixing unit main body 32. A groove 31a in which the fixing unit main body 32 is fitted is formed on the receiving member 31 along the Y-axis direction. As illustrated in FIG. 4, a hole 31e in which the first fastener B1 is inserted and a screw hole 31f in which the second fastener B2 is inserted are formed penetrating in the Z-axis direction on a bottom surface of the groove 31a.

The hole 31e is a hole having an inner circumferential surface that is not formed into a female screw surface.

The screw hole 31f is a hole having an inner circumferential surface that is formed into a female screw surface.

Additionally, a mounting surface 31b and a pressure receiving surface 31c are formed on the receiving member 31.

Figure 12:
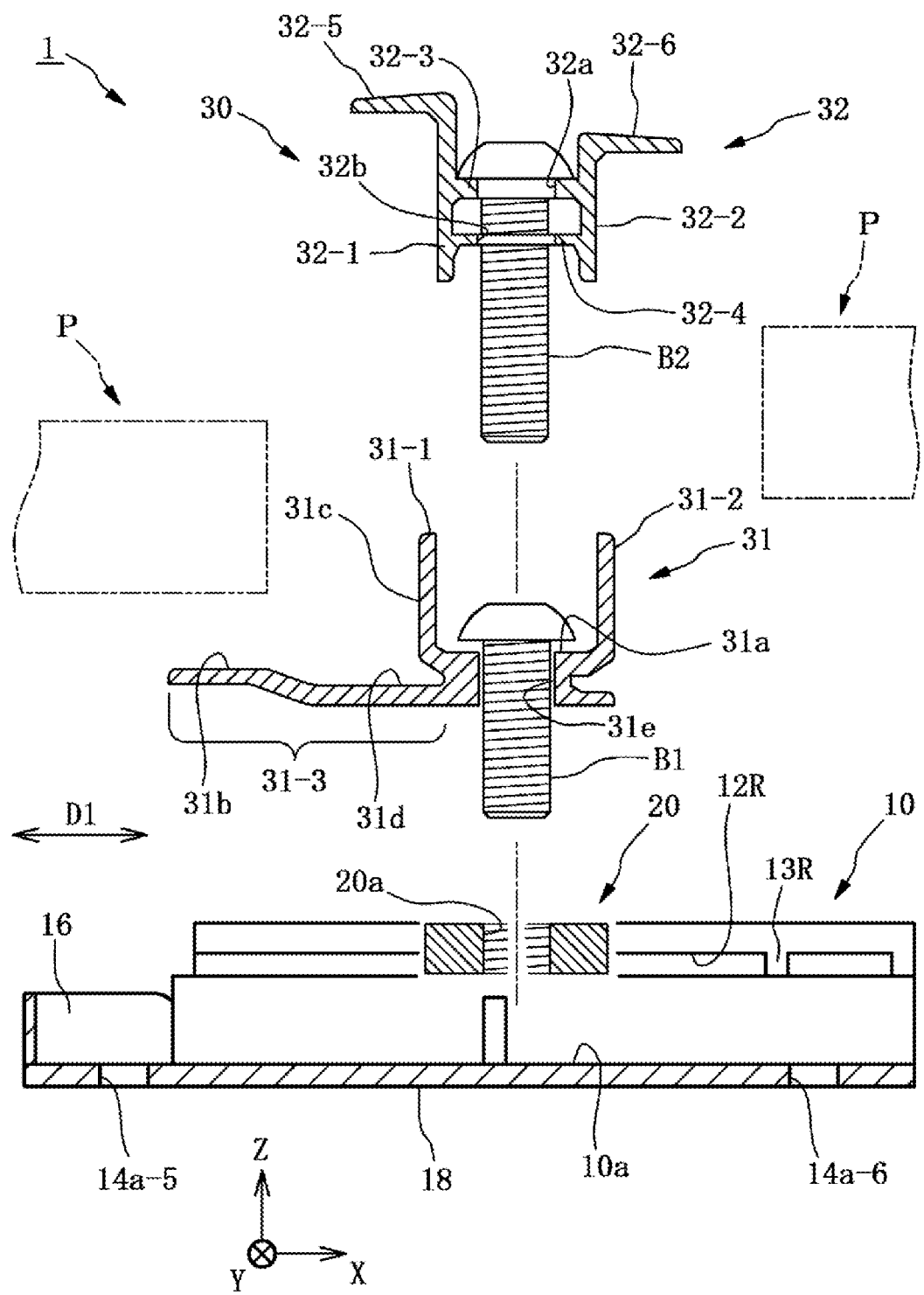
FIG. 12 is an (second) exploded cross-sectional view of the trestle according to Embodiment 1.

As illustrated in FIG. 12, the mounting surface 31b is provided on an upper surface (the +Z side surface) of an extension 31-3 (mount) extending from one side wall 31-1 of a pair of side walls 31-1, 31-2, the groove 31a being formed on the inner side of the side walls 31-1, 31-2. The solar panel P, which is the installation object of the trestle 1, is mounted on the mounting surface 31b. Additionally, the mounting surface 31b is configured from a surface roughly parallel to the XY plane, and a portion of the mounting surface 31b is formed recessed. The portion of the mounting surface 31b that is formed recessed is formed as a depression 31d.

The pressure receiving surface 31c is a surface that receives the weight of the solar panel P that is fixed by the fixing unit 30. The pressure receiving surface 31c is formed on the −X side surface of the side wall 31-1, and is formed on a surface parallel to the YZ plane.

As illustrated in FIG. 3, the fixing unit main body 32 is a fixture that is fixed to the receiving member 31 by the second fastener B2. The fixing unit main body 32 includes side walls 32-1, 32-2, coupling plates 32-3, 32-4, and extensions 32-5, 32-6.

The side walls 32-1, 32-2 are formed in a plate shape parallel to the YZ plane. The side wall 32-1 is provided overlapping the side wall 31-1 of the receiving member 31, with a gap between the side wall 32-1 and the side wall 31-1. The side wall 32-2 is provided overlapping the side wall 31-2 of the receiving member 31, with a gap between the side wall 32-2 and the side wall 31-2.

The coupling plates 32-3, 32-4 are formed in a plate shape parallel to the XY plane. These coupling plates 32-3, 32-4 couple the side walls 32-1, 32-2. Due to the side walls 32-1, 32-2 being coupled by the two coupling plates 32-3, 32-4, the strength of the fixing unit main body 32 is enhanced. A groove extending the Y-axis direction is formed on the inner side of the coupling plate 32-3, disposed upward (on the +Z side) from the coupling plate 32-4, and the side walls 32-1, 32-2. As illustrated in FIG. 4, a hole in which the second fastener B2 is inserted is formed on the coupling plate 32-3. Likewise, a hole in which the second fastener B2 is inserted is also formed on the coupling plate 32-4.

The extension 32-5 extends from an upper end (+Z side end) of the side wall 32-1. A lower surface of the extension 32-5 (−Z side surface) functions as a surface that holds down and fixes the solar panel P to the mounting surface 31b. Additionally, the extension 32-5 is formed such that a length in the extending direction (length in the X-axis direction) thereof is shorter than a length in the extending direction (length in the X-axis direction) of the extension 31-3 of the receiving member 31.

The extension 32-6 extends from an upper end (+Z side end) of the side wall 32-2 in a direction opposite the extending direction of the extension 32-5. A lower surface of the extension 32-6 (−Z side surface) functions as a surface that holds down and fixes the solar panel P.

As illustrated in FIG. 4, in the fixing unit main body 32 configured as described above, holes 32a, 32b penetrating in the Z-axis direction are respectively formed on the coupling plates 32-3, 32-4. As illustrated by arrow A1 of FIG. 4, a portion of a +Z side head of the first fastener B1 is exposed to the outside through these holes 32a, 32b. Additionally, the holes 32a, 32b are formed having a size such that the head of the first fastener B1 does not pass through in the Z-axis direction.

As illustrated in FIGS. 3 and 4, the first fastener B1 is constituted from a bolt or a screw, for example. The first fastener B1 is attached to the slide bracket 20 and the fixing unit 30 by being rotated around an axis. The first fastener B1 is attached to the slide bracket 20 and the fixing unit 30 such that the fixing between the slide bracket 20 and the fixing unit 30 can be released while maintaining the fixing between the receiving member 31 and the fixing unit main body 32 by the second fastener B2. Additionally, the first fastener B1 is attached to the slide bracket 20 and the fixing unit 30 such that a lower end of the first fastener B1 protrudes into the first groove 10a of the base 10.

A fitted hole B1a, in which a tool for releasing the fixing of the slide bracket 20 and the fixing unit 30 fits, is formed on the first fastener B1. The fitted hole Bla of the first fastener B1 is exposed to the outside in the Z-axis direction (axial direction of the first fastener B1) through the holes 32a, 32b formed on the fixing unit main body 32.

The second fastener B2 is constituted from a bolt or a screw, for example. The second fastener B2 is attached to the fixing unit 30 by being rotated around an axis. The second fastener B2 is provided such that an axis thereof is parallel to the axis of the first fastener B1. Additionally, the second fastener B2 is attached to fixing unit 30 such that a lower end of the second fastener B2 protrudes out from the groove forming portion 11 of the base 10.

As described above, with the base 10 of the trestle 1 according to Embodiment 1, as illustrated in FIG. 1, the wall 16 is provided on the end toward the ridge (toward the −X side) of the base main body 15, is formed protruding with respect to the roof surface R, and is formed integrally with the base main body 15. As such, in Embodiment 1, a base 10 of a trestle 1 whereby manufacturing costs can be suppressed, a trestle 1 provided with the base 10, and a manufacturing method for the base 10 of the trestle 1 can be provided.

Figure 13:
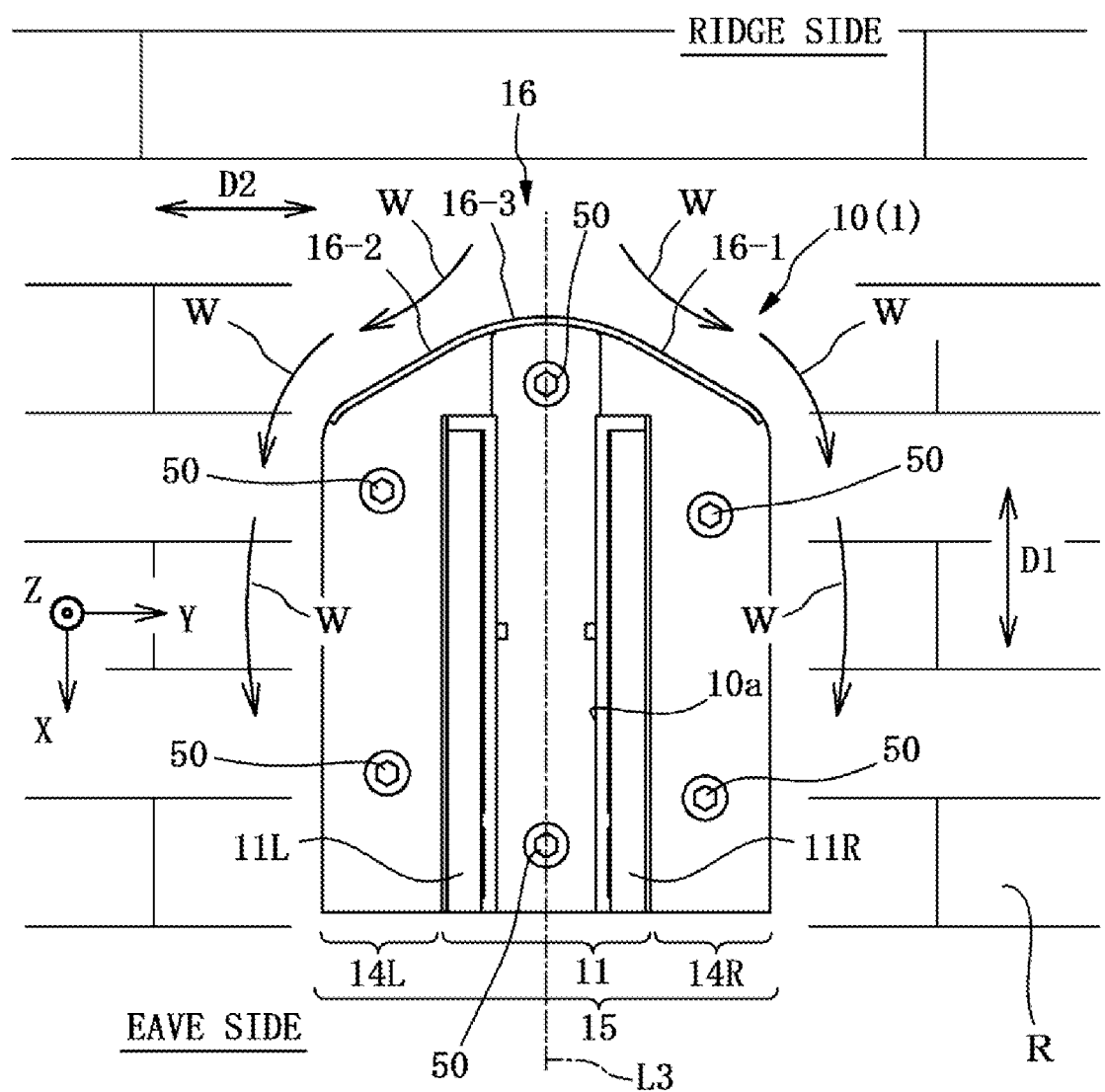
FIG. 13 is a (first) plan view for explaining the effects of the base according to Embodiment 1.

The base 10 of the trestle 1 according to Embodiment 1 includes the wall 16 that is provided at the end toward the ridge (toward the −X side) in the base main body 15, and that is formed protruding in the +Z direction with respect to the roof surface R of the building. As illustrated in FIG. 13, the wall 16 can direct rainwater W flowing from the ridge side in the eave direction (the +X direction) while dividing the rainwater W to the left and right, namely, to the −Y side and the +Y side. As such, the rainwater W flowing on the roof surface R of the building can be prevented from contacting the fasteners 50 that mount the trestle 1 to the roof surface R. As a result, the base 10 according to Embodiment 1 can suppress deterioration of the fasteners 50 caused by the rainwater W. For example, when the fasteners 50 are made from wood, rotting of the fasteners 50 can be prevented from progressing. By extension, the base 10 according to Embodiment 1 can suppress deterioration of the fasteners 50 caused by the rainwater W. As a result, the base 10 according to Embodiment 1 can suppress reductions in the fixing force of the trestle 1 to the roof surface R.

As illustrated in FIGS. 11A and 11B, the base 10 of the trestle 1 according to Embodiment 1 is formed by die casting. As such, in Embodiment 1, the manufacturing cost of the base 10 can be suppressed. Generally, the base 10 is manufactured by extruding a metal such as aluminum or the like, or by press-molding a metal plate. As such, when manufacturing the shape of the base 10 according to Embodiment 1 by extruding or press molding, there may be a need for secondary machining such as cutting or the like in order to form protrusions in directions different than the extrusion direction of the extruding or the pressing direction of the press molding. In such cases, the manufacturing cost of the base 10 may increase. However, in Embodiment 1, the base 10 is formed by die casting and, as such, the manufacturing cost of the base 10 can be suppressed. By extension, in Embodiment 1, a base 10 of a trestle 1 whereby manufacturing costs can be suppressed, a trestle 1 provided with the base 10, and a manufacturing method for the base 10 of the trestle 1 can be provided.

The base 10 of the trestle 1 according to Embodiment 1 is formed by die casting. As such, as illustrated in FIG. 13, with the base 10 of the trestle 1 according to Embodiment 1, the wall 16 can be formed at a position in the base main body 15 where it is easiest to prevent the rainwater W from contacting the fasteners 50. Additionally, in Embodiment 1, the base 10 can be formed in a shape that protrudes in the +Z direction with respect to the roof surface R.

With the base 10 of the trestle 1 according to Embodiment 1, the wall 16 is formed integrally with the base main body 15. As such, the wall 16 can be formed strongly on the base main body 15. As a result, the wall 16 can be prevented from detaching from the base main body 15 due to the pressure of the rainwater W caused by the rainwater W flowing from the ridge side contacting the wall 16.

With the base 10 of the trestle 1 according to Embodiment 1, the wall 16 is formed integrally with the base main body 15. As such, due to the base main body 15 and the wall 16 being formed as separate bodies, the wall 16 is easier to dispose at a desired position on the roof surface R regardless of the skill of the worker in Embodiment 1 than in a case in which the base main body 15 is mounted on the roof surface R and, thereafter, the wall 16 is attached to the base main body 15. As a result, in Embodiment 1, the work efficiency of installing the base 10 on the roof surface R of the building can be improved.

With the base 10 of the trestle 1 according to Embodiment 1, the first inclined surface 16-1, the second inclined surface 16-2, and the protruding surface 16-3 are formed on the wall 16. As such, the effect of preventing the rainwater W flowing on the roof surface R of the building from contacting the fasteners 50 that mount the trestle 1 to the roof surface R can be further enhanced.

Figure 14:
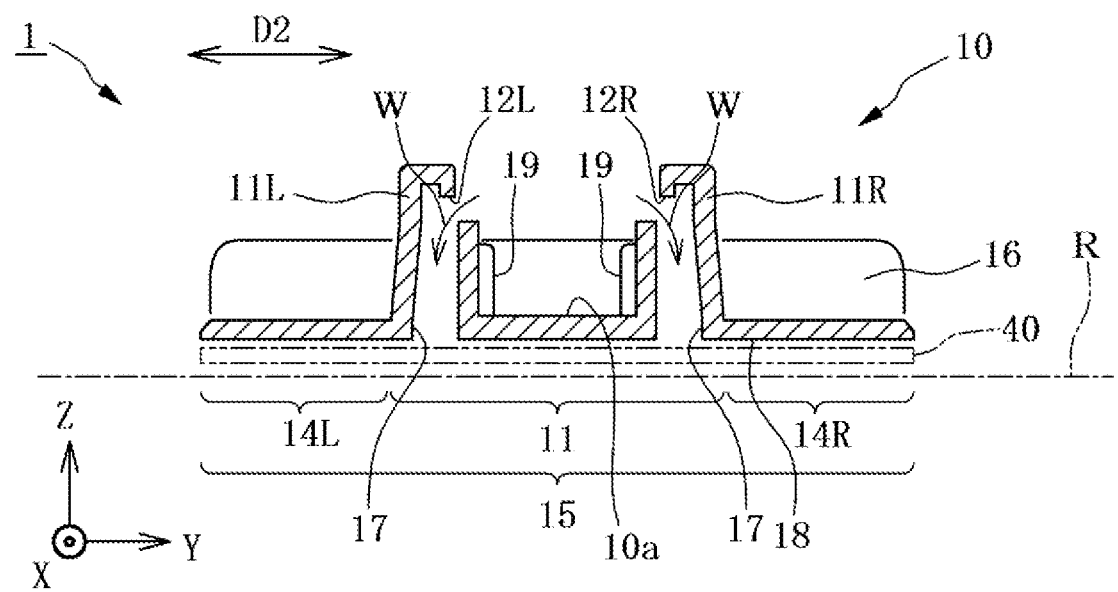
FIG. 14 is a (first) cross-sectional view for explaining the effects of the base according to Embodiment 1.
Figure 15:
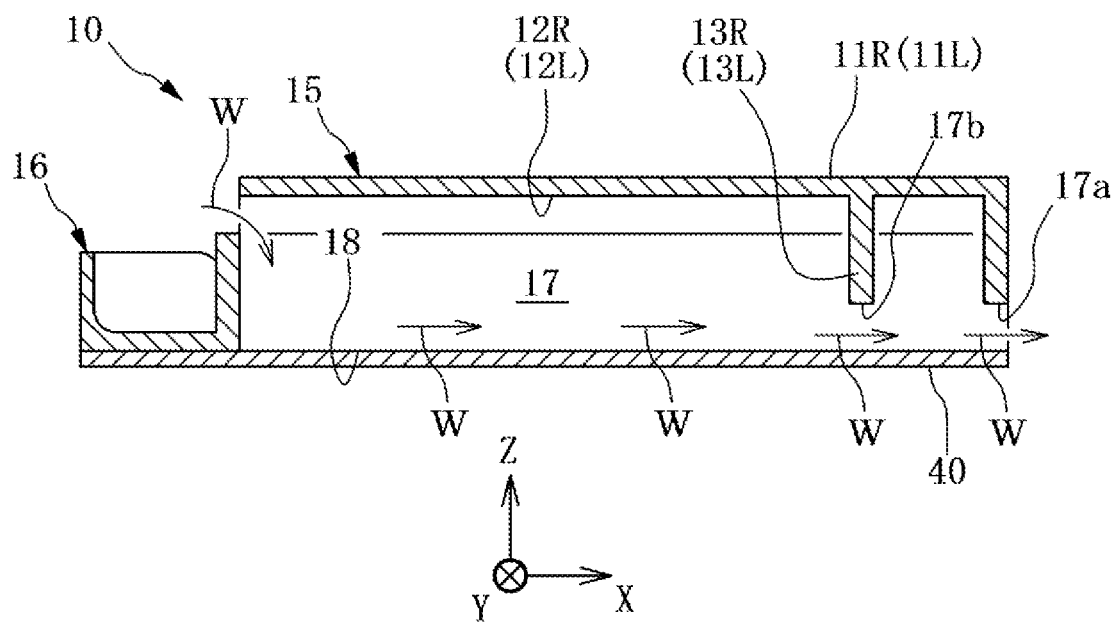
FIG. 15 is a (second) cross-sectional view for explaining the effects of the base according to Embodiment 1.

With the base 10 of the trestle 1 according to Embodiment 1, as illustrated in FIGS. 14 and 15, the flowpath 17 is formed in the interior of the side walls 11R, 11L. Due to this configuration, in the base 10, even if the rainwater W flows over the wall 16 and enters onto the base main body 15, the rainwater W flows on the flowpath 17. The rainwater W flowing on the flowpath 17 flows on the interior flowpath 17b formed on the lower sides (the −Z sides) of the slide restrictors 13R, 13L and, then, is discharged out of the base main body 15 through the discharge port 17a. Thus, the rainwater W can be discharged out of the base main body 15.

Additionally, in Embodiment 1, as illustrated in FIG. 3, the slide restrictors 13R, 13L are formed on the second grooves 12R, 12L formed on the respective opposing surfaces of the pair of side walls 11R, 11L. As such, when the trestle 1 is mounted on the roof surface R in a state in which the first direction D1 of the trestle 1 matches the eave-ridge direction of the roof surface R as illustrated in FIG. 2, the slide restrictors 13R, 13L restrict sliding in the +X direction of the slide bracket 20 and the fixing unit 30 with respect to the base 10, as illustrated in FIG. 3. As a result, the trestle 1 according to Embodiment 1 can enhance the work efficiency when carrying out installation/removal work on the roof surface R of the house.

In Embodiment 1, the slide restrictors 13R, 13L are formed in the second grooves 12R, 12L. As such, the rigidity of the side walls 11R, 11L can be enhanced. Moreover, due to the rigidity of the side walls 11R, 11L being enhanced, the slide restrictors 13R, 13L can further enhance the effect of suppressing the slide bracket 20 from detaching from the base 10. Furthermore, the slide restrictors 13R, 13L enhance the rigidity, with respect to forces in a compression direction applied to the slide bracket 20, of the wall in the first groove 10a is formed. Moreover, due to the enhancement of the rigidity of the wall in which the first groove 10a is formed, the slide restrictors 13R, 13L can suppress buckling of the wall in which the first groove 10a is formed.

Additionally, with the trestle 1 according to Embodiment 1, as illustrated in FIGS. 1 and 7, the fastener insertion holes 14a-1 to 14a-6 are formed at positions offset in the eave-ridge direction. As such, it is possible to prevent all roof surface mounting fixtures that are inserted into the fastener insertion holes 14a-1 to 14a-6 from being stuck into the gaps between roofing boards of the roof surface R. Thus, the mounting strength of the base 10 with respect to the roof surface R can be enhanced.

Embodiment 2

In Embodiment 1, the first inclined surface 16-1 is formed at the angle of inclination θ of 120° with respect to the second inclined surface 16-2. However, the present disclosure is not limited thereto. The first inclined surface 16-1 may be formed at a different angle of inclination θ than 120° with respect to the second inclined surface 16-2. In the following, a base 10B of a trestle 2 according to Embodiment 2 is described while referencing the drawings. With this base 10B, the angle of inclination of the first inclined surface 16-1 relative to the second inclined surface 16-2 is formed at a different angle of inclination than 120°. The description focuses on the differences with Embodiment 1. With the exception of these differences, the trestle 2 according to Embodiment 2 is the same as or equivalent to the trestle 1 of Embodiment 1. Note that, to facilitate comprehension, XYZ coordinates are set and appropriately referenced.

Figure 16:
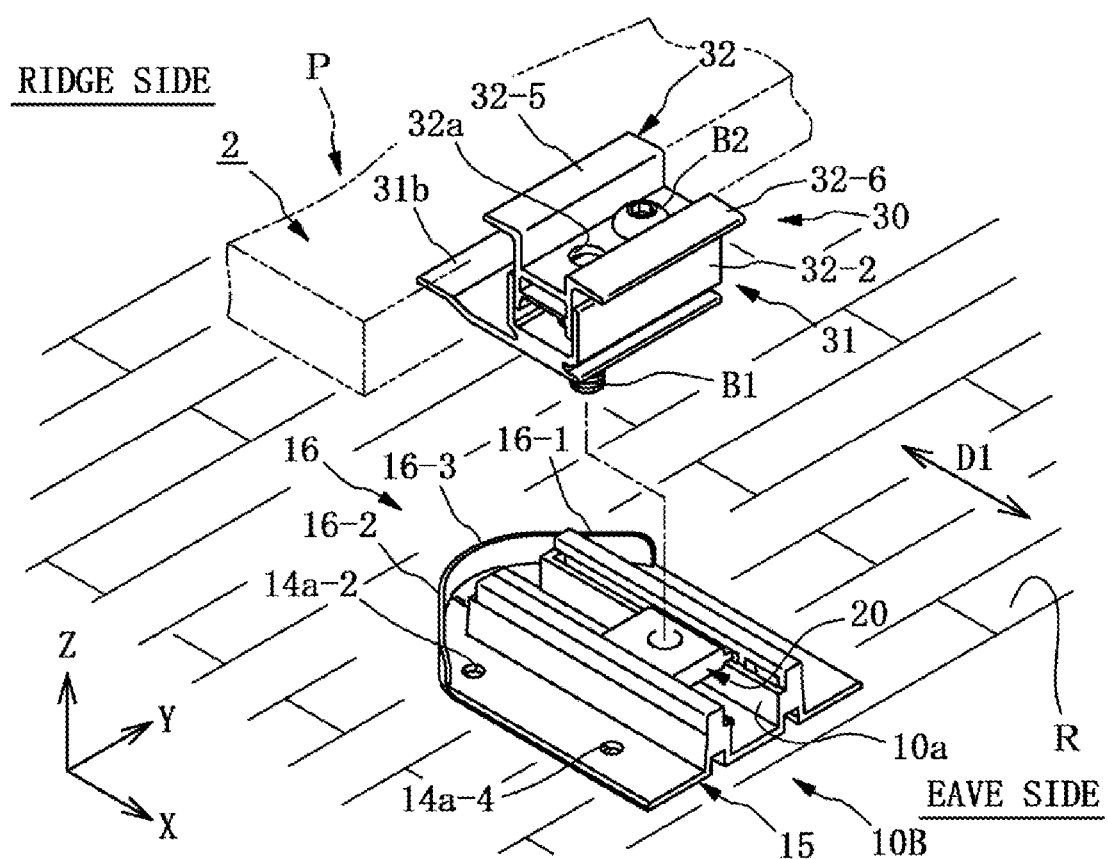
FIG. 16 is an exploded perspective view of a trestle according to Embodiment 2.

As illustrated in FIG. 16, the trestle 2 according to Embodiment 2 includes the base 10B, the slide bracket 20, and the fixing unit 30.

Figure 17:
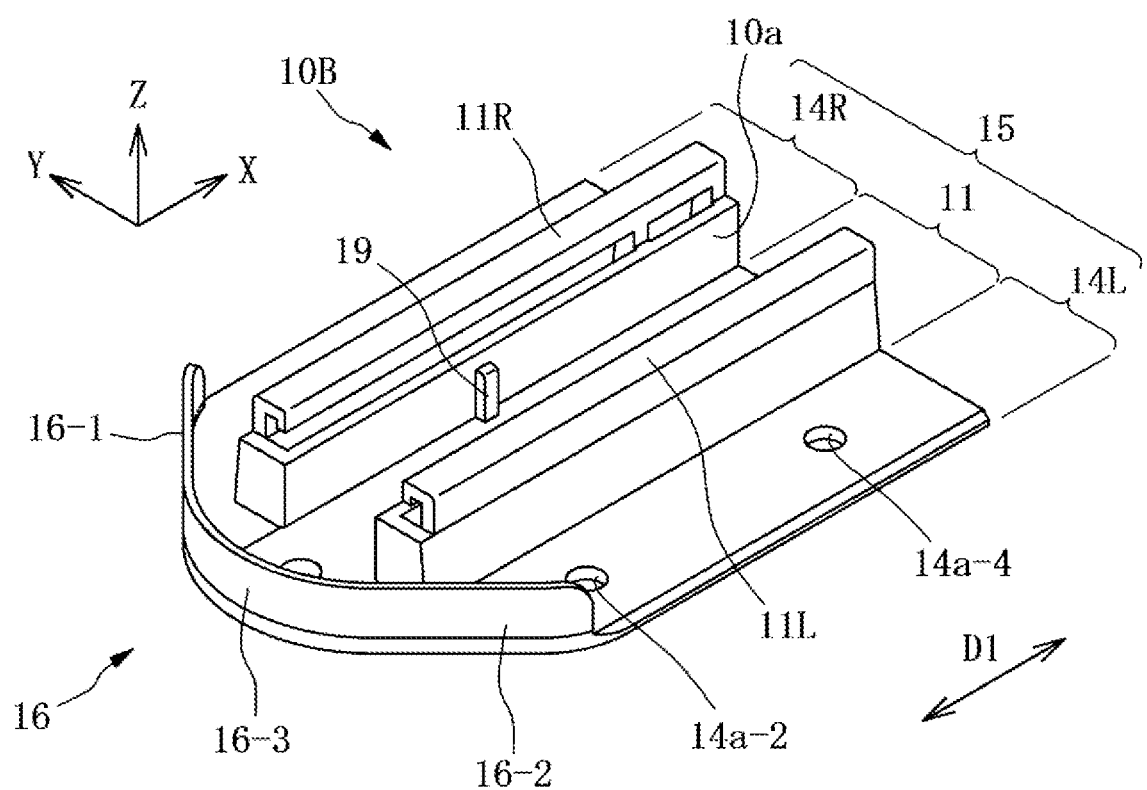
FIG. 17 is a perspective view of a base according to Embodiment 2.

The base 10B is a member that supports the fixing unit 30. In one example, the base 10B is formed from a metal. Specifically, the base 10B is formed by die casting using dies, for example. As illustrated in FIG. 17, the base 10B includes the base main body 15 and the wall 16.

The base main body 15 is used mounted on a roof of a building. Additionally, the first groove 10a, as a fixing groove, that is used to fix the solar panel P is formed on the base main body 15.

The wall 16 is provided at the end toward the ridge (toward the −X side) in the base main body 15, and is formed protruding upward (in the +Z direction) with respect to the XY plane. The wall 16 is formed integrally with the base main body 15 by die casting. For example, the wall 16 is used to prevent rainwater flowing from the ridge side from contacting the fasteners inserted into the fastener insertion holes 14a-2, 14a-4. The first inclined surface 16-1, the second inclined surface 16-2, and the protruding surface 16-3 are formed on the wall 16.

Figure 18:
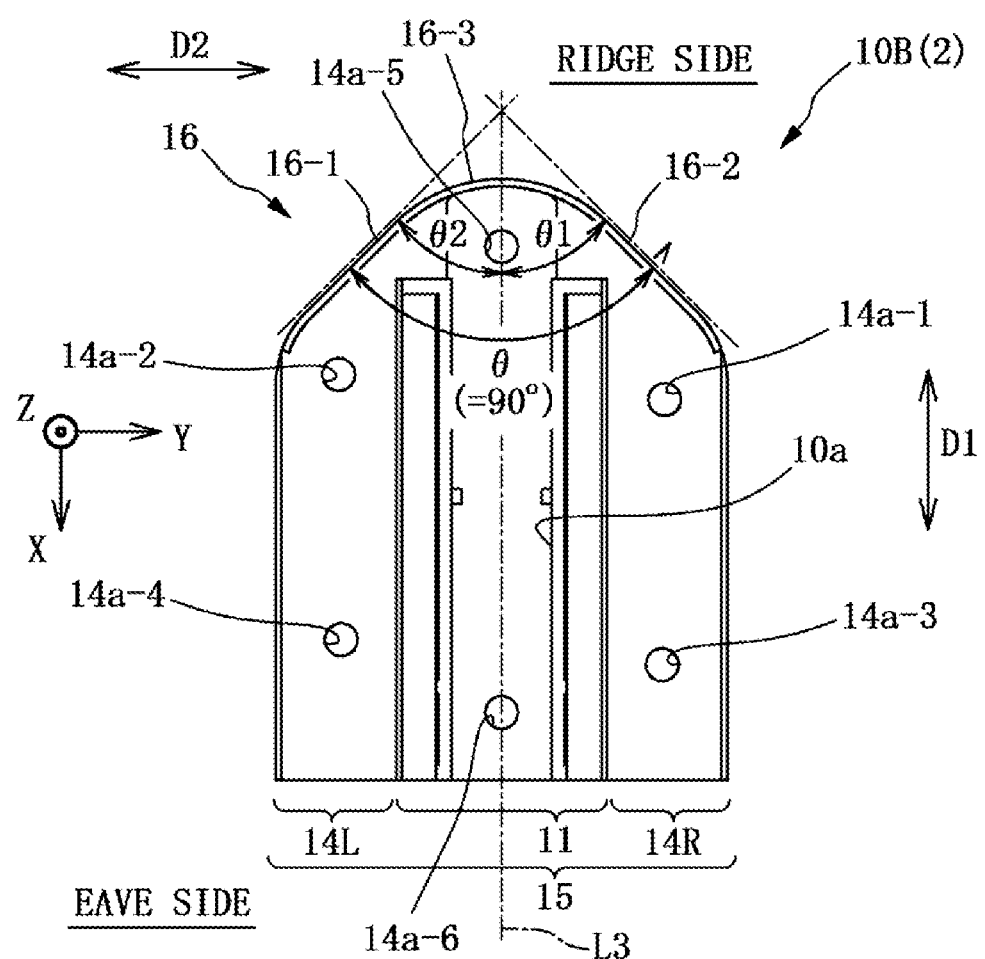
FIG. 18 is a plan view of the base according to Embodiment 2.

As illustrated in FIG. 18, the first inclined surface 16-1 is formed inclined with respect to the first direction D1. Specifically, the angle of inclination θ1 of the first inclined surface 16-1, relative to the straight line L3 that passes through the centers of the fastener insertion holes 14a-5, 14a-6, is 45°. As illustrated in FIG. 17, the first inclined surface 16-1 is formed on a plane orthogonal to the XY plane that is parallel to the roof of the building.

As illustrated in FIG. 18, the second inclined surface 16-2 is a separate inclined surface from the first inclined surface 16-1. The second inclined surface 16-2 is formed inclined with respect to the first direction D1. Specifically, the angle of inclination θ2 of the second inclined surface 16-2, relative to the straight line L3 that passes through the centers of the fastener insertion holes 14a-5, 14a-6, is 45°. The second inclined surface 16-2 and the first inclined surface 16-1 are formed with plane symmetry to the XZ plane that includes the straight line L3. As illustrated in FIG. 17, the second inclined surface 16-2 is formed on a plane orthogonal to the XY plane that is parallel to the roof of the building.

The angle of inclination θ1 of the first inclined surface 16-1 is 45° and, also, the angle of inclination θ2 of the second inclined surface 16-2 is 45° and, as such, in Embodiment 2, the first inclined surface 16-1 is formed at an angle of inclination θ of 90° with respect to the second inclined surface 16-2.

As illustrated in FIGS. 17 and 18, the protruding surface 16-3 is provided between the first inclined surface 16-1 and the second inclined surface 16-2. The protruding surface 16-3 is formed protruding in the ridge direction (the −X direction). The protruding surface 16-3 is formed as a curved surface in Embodiment 2.

The base 10B configured in the manner described above is manufactured while integrally forming the base main body 15 and the wall 16 by, for example, performing casting in which at least two dies are opened in the up-down direction (the +Z direction and the −Z direction). However, the present disclosure is not limited thereto, and a manufacturing method other than die casting may be used provided that the base main body 15 and the wall 16 can be integrally formed.

The slide bracket 20 and the fixing unit 30 are the same as in Embodiment 1.

Figure 19:
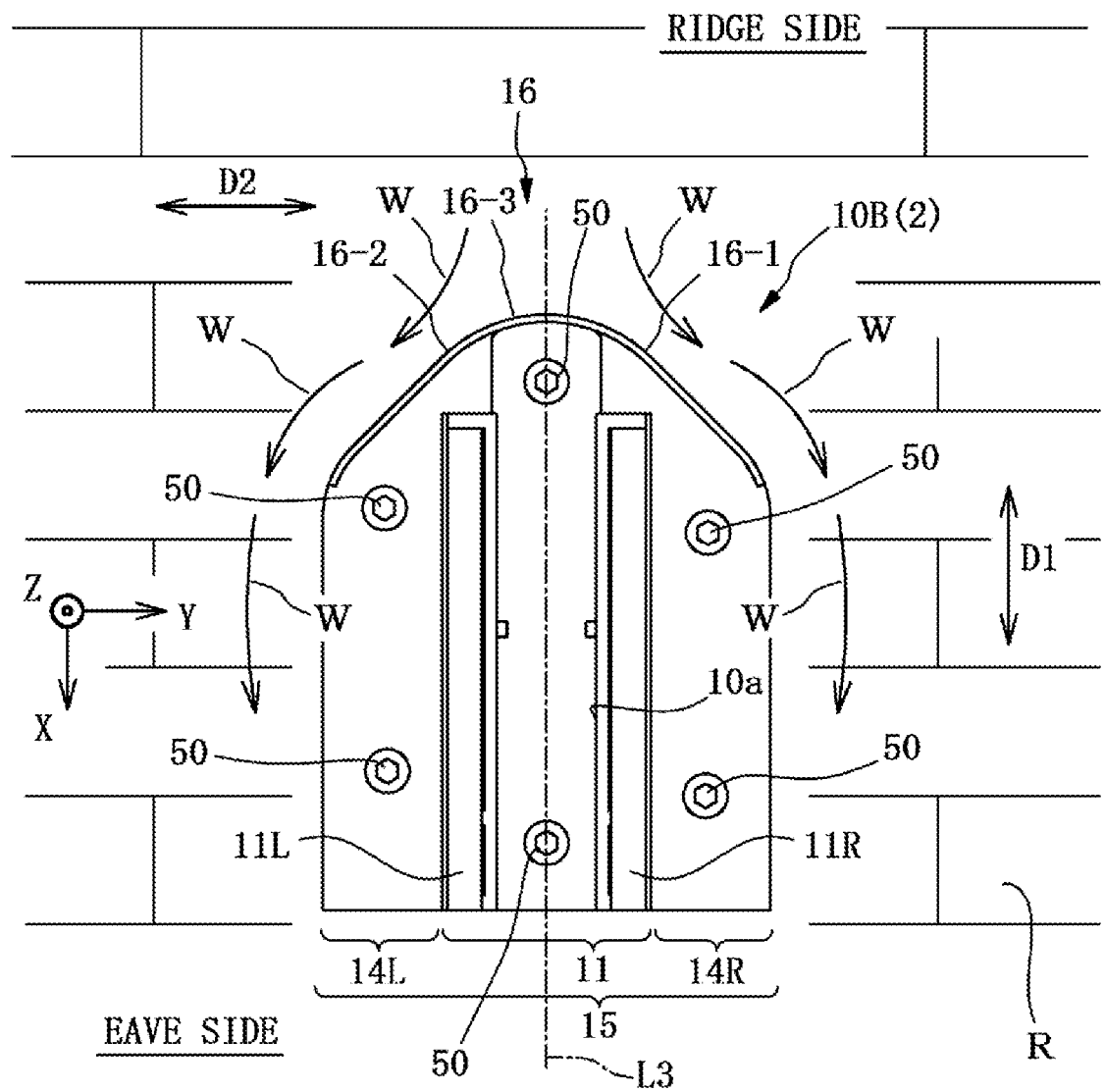
FIG. 19 is a plan view for explaining the effects of the base according to Embodiment 2.

Thus, as described above, with the base 10B of the trestle 2 according to Embodiment 2, as illustrated in FIG. 18, the first inclined surface 16-1 is formed at an angle of inclination θ of 90° with respect to the second inclined surface 16-2. Accordingly, the angles of inclination θ1 and θ2 are smaller compared to Embodiment 1 and, as such, as illustrated in FIG. 19, the base 10B can effectively direct the rainwater W in the ridge direction. As such, the wall 16 can prevent the rainwater W flowing on the roof surface R of the building from contacting the fasteners 50 that mount the trestle 2 to the roof surface R. As a result, the base 10B according to Embodiment 2 can suppress deterioration of the fasteners 50 caused by the rainwater W. As a result, the base 10B according to Embodiment 2 can suppress reductions in the fixing force of the trestle 2 to the roof surface R.

Figure 20:
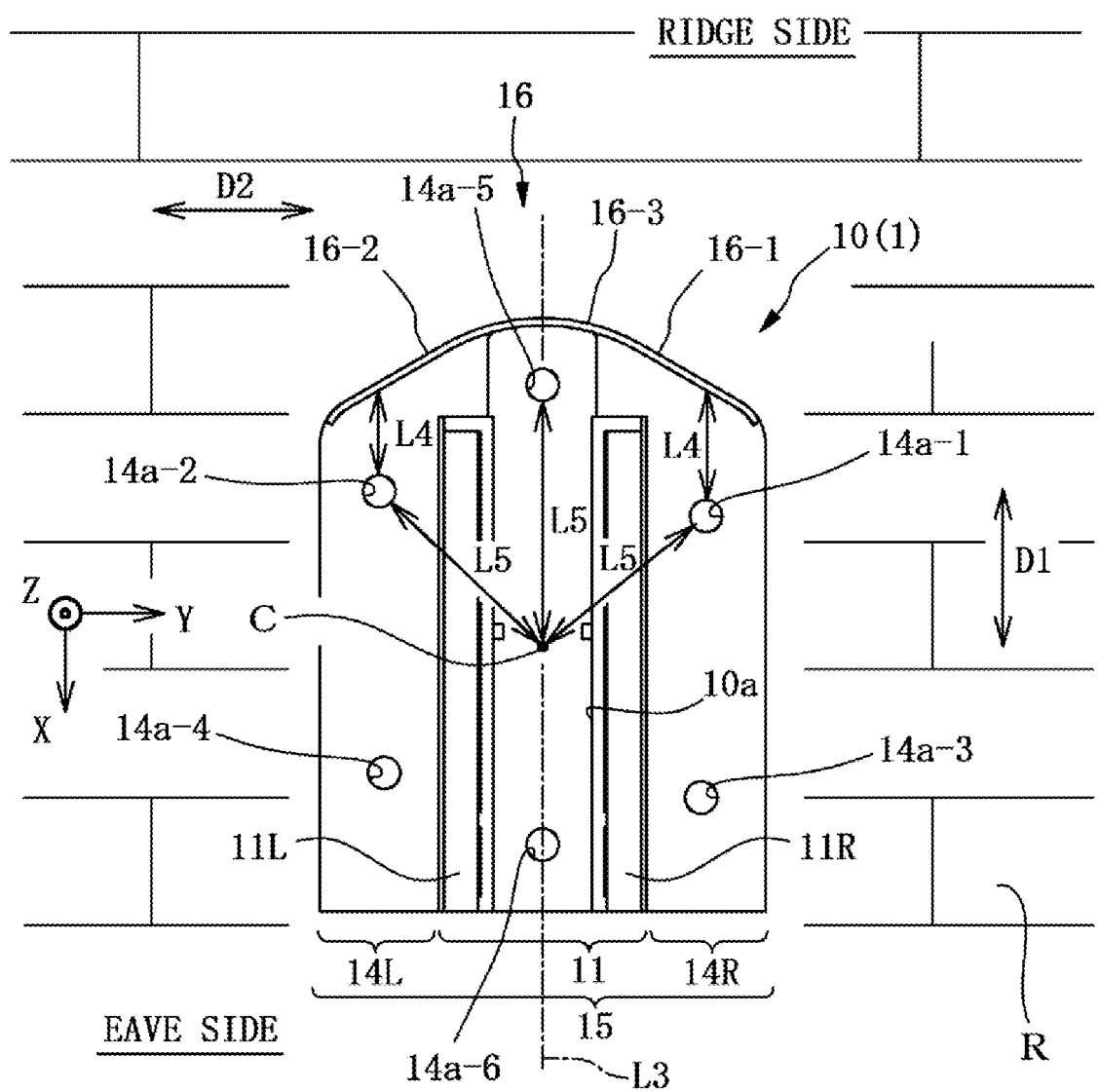
FIG. 20 is a (second) plan view for explaining the effects of the base according to Embodiment 1.

However, forming the first inclined surface 16-1 at the angle of inclination θ of 120° with respect to the second inclined surface 16-2 as in Embodiment 1 facilitates securing of the area of the base main body 15 when viewed planarly, as illustrated in FIG. 20. Due to this, it is possible to secure a distance L4 from the wall 16 to the formation positions of the fastener insertion holes 14a-1, 14a-2, 14a-5 so that the hands and/or tools of the worker do not interfere with the wall 16 and, at the same time, increase a distance L5 from the center of gravity C of the base main body 15 to the formation positions of the fastener insertion holes 14a-1, 14a-2, 14a-5. The strength of the base 10 can be enhanced and the fixing strength of the base 10 to the roof surface R can be enhanced by increasing the distance L5.

With the exception of the angle of inclination θ of the wall 16, the base 10B according to Embodiment 2 has a structure equivalent to that of Embodiment 1 and, as such, can demonstrate effects equivalent to those of Embodiment 1.

Embodiments of the present disclosure are described above, but the present disclosure is not limited by the embodiments described above.

For example, in Embodiments 1 and 2, as illustrated in FIGS. 13 and 19, the first inclined surface 16-1, the second inclined surface 16-2, and the protruding surface 16-3 are formed on the wall 16. However, the present disclosure is not limited thereto. A configuration is possible in which at least one of the first inclined surface 16-1, the second inclined surface 16-2, and the protruding surface 16-3 is formed on the wall 16. As a result of at least one of the first inclined surface 16-1, the second inclined surface 16-2, and the protruding surface 16-3 is formed, the base 10, 10B can direct the rainwater W in the ridge direction. However, from the perspective of efficiently directing the rainwater W in the ridge direction, it is preferable that the first inclined surface 16-1, the second inclined surface 16-2, and the protruding surface 16-3 be formed on the wall 16.

Figure 21:
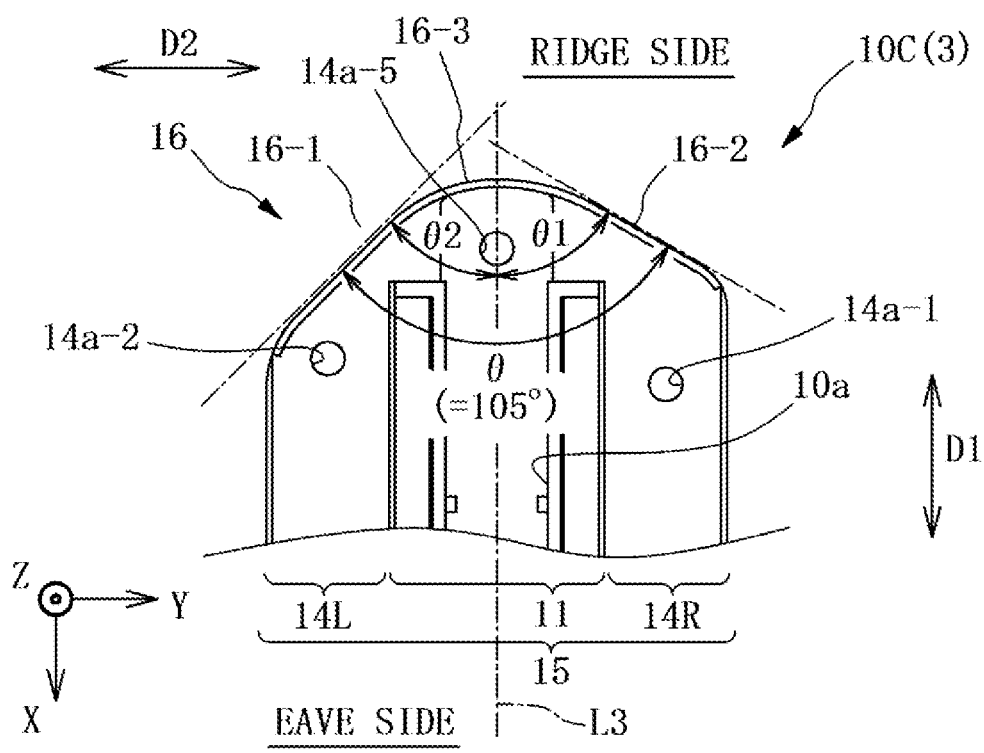
FIG. 21 is a plan view for explaining the effects of a base according to Embodiment 3.

In Embodiments 1 and 2, as illustrated in FIGS. 10 and 18, the angle of inclination θ of the first inclined surface 16-1 relative to the second inclined surface 16-2 is 120° or 90°. However, the present disclosure is not limited thereto. As with a base 10C of a trestle 3 according to Embodiment 3 illustrated in FIG. 21, a configuration is possible in which the angle of inclination θ is an angle other than 120° or 90°. However, from the perspective of the rainwater entrance suppressing effects of the wall 16, it is preferable that the angle of inclination θ be in a range of 90° to 150°.

In Embodiments 1 and 2, as illustrated in FIGS. 10 and 18, the first inclined surface 16-1 and the second inclined surface 16-2 are formed with plane symmetry to the XZ plane that includes the straight line L3 (θ1=θ2). However, the present disclosure is not limited thereto. As with the base 10C according to Embodiment 3 illustrated in FIG. 21, a configuration is possible in which the first inclined surface 16-1 and the second inclined surface 16-2 are formed asymmetrically with respect to the XZ plane that includes the straight line L3 (θ1≠θ2). In Embodiment 3, an example is illustrated in which the angle of inclination θ1 is 60° and the angle of inclination θ2 is 45°, but the angles of the angle of inclination θ1 and θ2 are not limited thereto.

Figure 22:
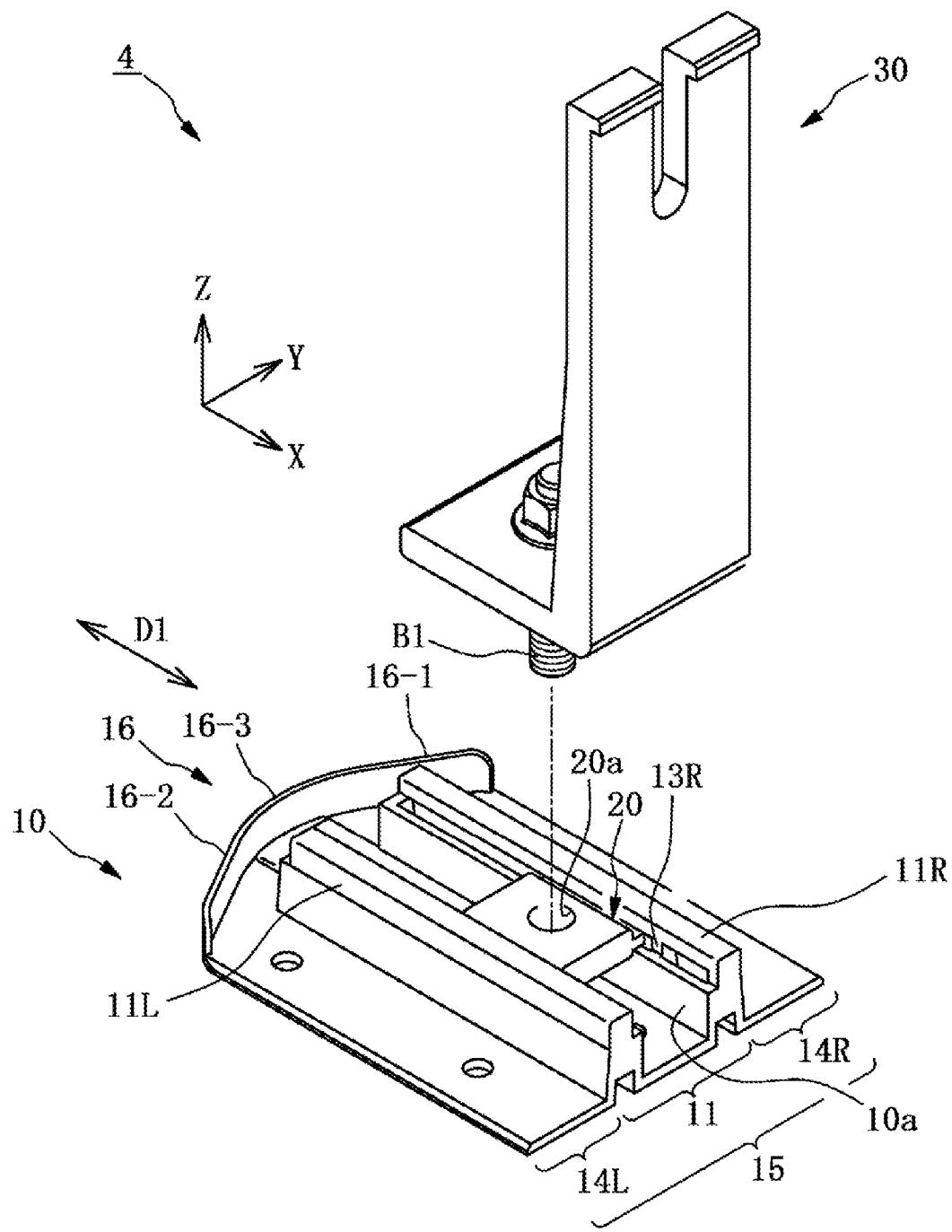
FIG. 22 is an exploded perspective view of a trestle according to Embodiment 4.

In Embodiments 1 and 2, as illustrated in FIGS. 1 and 16, the fixing unit 30 includes the receiving member 31 and the fixing unit main body 32. However, the present disclosure is not limited thereto. As with the trestle 4 according to Embodiment 4 illustrated in FIG. 22, a configuration is possible in which the fixing unit 30 has a shape and/or structure different from Embodiments 1 and 2. Additionally, a configuration is possible in which the base 10 directly fixes the solar panel. In such a case, the trestle 4 includes only the base 10, and does not include the slide bracket 20 and the fixing unit 30.

In Embodiments 1 and 2, examples are described in which the installation object that the trestle 1, 2 supports is the solar panel P. However, the present disclosure is not limited thereto. A configuration is possible in which the installation object that the trestle 1, 2 supports is an object other than the solar panel P. For example, the installation object that the trestle 1, 2 supports may be a rooftop-installation object such as a greenery device or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

1, 2, 3, 4 Trestle
10, 10B, 10C Base
10a First groove (fixing groove)
11 Groove forming portion
11R, 11L Side wall
11a, 11b Opposing surface
12R, 12L Second groove
13R, 13L Slide restrictor
14R, 14L Flange portion
14a-1, 14a-2, 14a-3, 14a-4, 14a-5, 14a-6 Fastener insertion hole
15 Base main body
16 Wall
16-1 First inclined surface
16-2 Second inclined surface
16-3 Protruding surface
17 Flowpath
17a Discharge port
17b Interior flowpath
18 Rear surface
19 Rib
20 Slide bracket
20a Screw hole
20b Fitter
30 Fixing unit
31 Receiving member
31-1 Side wall
31-2 Side wall
31-3 Extension
31a Groove
31b Mounting surface
31c Pressure receiving surface
31d Depression
31e Hole
31f Screw hole
32 Fixing unit main body
32-1, 32-2 Side wall
32-3, 32-4 Coupling plate
32-5, 32-6 Extension
32a, 32b Hole
40 Sheet
50 Fastener
B1 First fastener
B1a Fitted hole
B2 Second fastener
Da First die
Db Second die
P Solar panel (installation object)
R Roof surface
W Rainwater
D1 First direction
D2 Second direction
A1 Arrow
L1, L2, L3 Straight line
L4, L5 Distance
θ, θ1, θ2 Angle of inclination
C Center of gravity

INDUSTRIAL APPLICABILITY

The present disclosure is suitable for use in a base of a trestle that is mounted on a roof surface of a house and that supports a solar panel installed on a surface of the roof surface, a trestle provided with the base, and a manufacturing method for the base of the trestle.

What is claimed is:

1. A base of a trestle for fixing an installation object to be installed on a roof surface of a building including an eave of a roof and a ridge provided upward from the eave, the base comprising:
    a base main body that is attached to the roof surface and in which a fixing groove used to fix the installation object is formed; and
    a base wall that is provided on an end of the base main body, is formed protruding from the end, is formed protruding upwardly and outwardly with respect to the roof surface, and is formed integrally with the base main body, wherein
    the end of the base main body is the end provided toward the ridge of the building,
    the base main body includes a first side wall and a second side wall,
    the fixing groove is formed between the first side wall and the second side wall,
    a first flowpath on which a fluid can flow from the fixing groove is formed on an interior of the first side wall, a second flowpath on which the fluid can flow from the fixing groove is formed on an interior of the second side wall, a first discharge port through which the fluid flowing in the first flowpath is discharged from the interior of the first side wall out of the base main body is formed at an end on the eave side of the first side wall, a second discharge port through which the fluid flowing in the second flowpath is discharged from the interior of the second side wall out of the base main body is formed at an end on the eave side of the second side wall, an end on the eave side of the first side wall is disposed away from the base wall, and the first side wall is provided at a position where the fluid flowing over the base wall flows in the first flowpath from the fixing groove, and an end on the eave side of the second side wall is disposed away from the base wall, and the second side wall is provided at a position where the fluid flowing over the base wall flows in the second flowpath from the fixing groove.

2. The base of the trestle according to claim 1, wherein a first inclined surface that is inclined with respect to an eave-ridge direction is formed on the base wall, the eave-ridge direction being a direction from the ridge toward the eave of the building.

3. The base of the trestle according to claim 2, wherein the first inclined surface is formed on a plane orthogonal to the roof surface.

4. The base of the trestle according to claim 2, wherein a second inclined surface that has a different incline with respect to the eave-ridge direction than the first inclined surface is formed on the base wall.

5. The base of the trestle according to claim 4, wherein the second inclined surface is formed on a plane orthogonal to the roof surface.

6. The base of the trestle according to claim 4, wherein the first inclined surface is formed at an angle of inclination within a range of 90° to 150° with respect to the second inclined surface.

7. The base of the trestle according to claim 6, wherein the angle of inclination of the first inclined surface relative to the second inclined surface is 120°.

8. The base of the trestle according to claim 6, wherein the angle of inclination of the first inclined surface relative to the second inclined surface is 90°.

9. The base of the trestle according to claim 4, wherein a protruding surface that is provided between the first inclined surface and the second inclined surface and that protrudes in a ridge direction is formed on the base wall.

10. The base of the trestle according to claim 9, wherein the protruding surface is formed as a curved surface.

11. The trestle, comprising:
the base of a trestle according to claim 1.

12. The trestle according to claim 11, comprising:
a slide member slidably fitted in the fixing groove; and
a fixing unit installed on the slide member and for fixing the installation object.

13. A manufacturing method for the base of the trestle according to claim 1, the manufacturing method comprising:
integrally forming the base main body and the base wall by casting.

* * * * *